H. HOPKINS.
CALCULATING MACHINE.
APPLICATION FILED MAY 11, 1908.

1,118,489.

Patented Nov. 24, 1914.
16 SHEETS—SHEET 1.

Witnesses:
George Ladeau
A. J. McCauley

Inventor,
Hubert Hopkins.
by Bakewell + Cornwall
Attys.

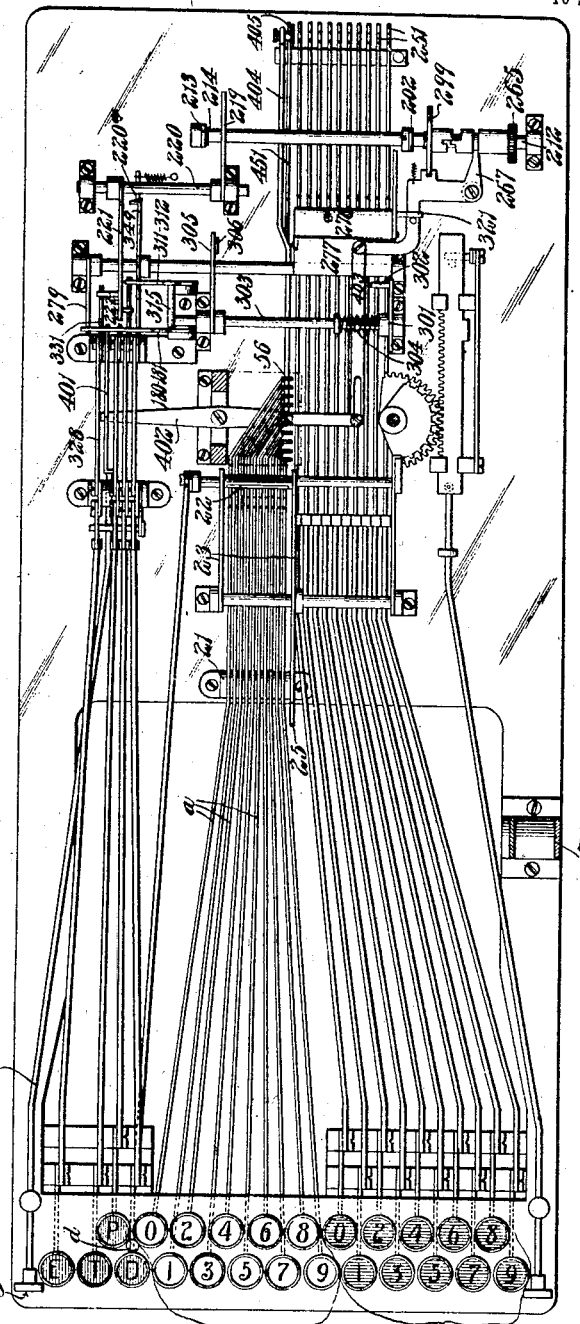

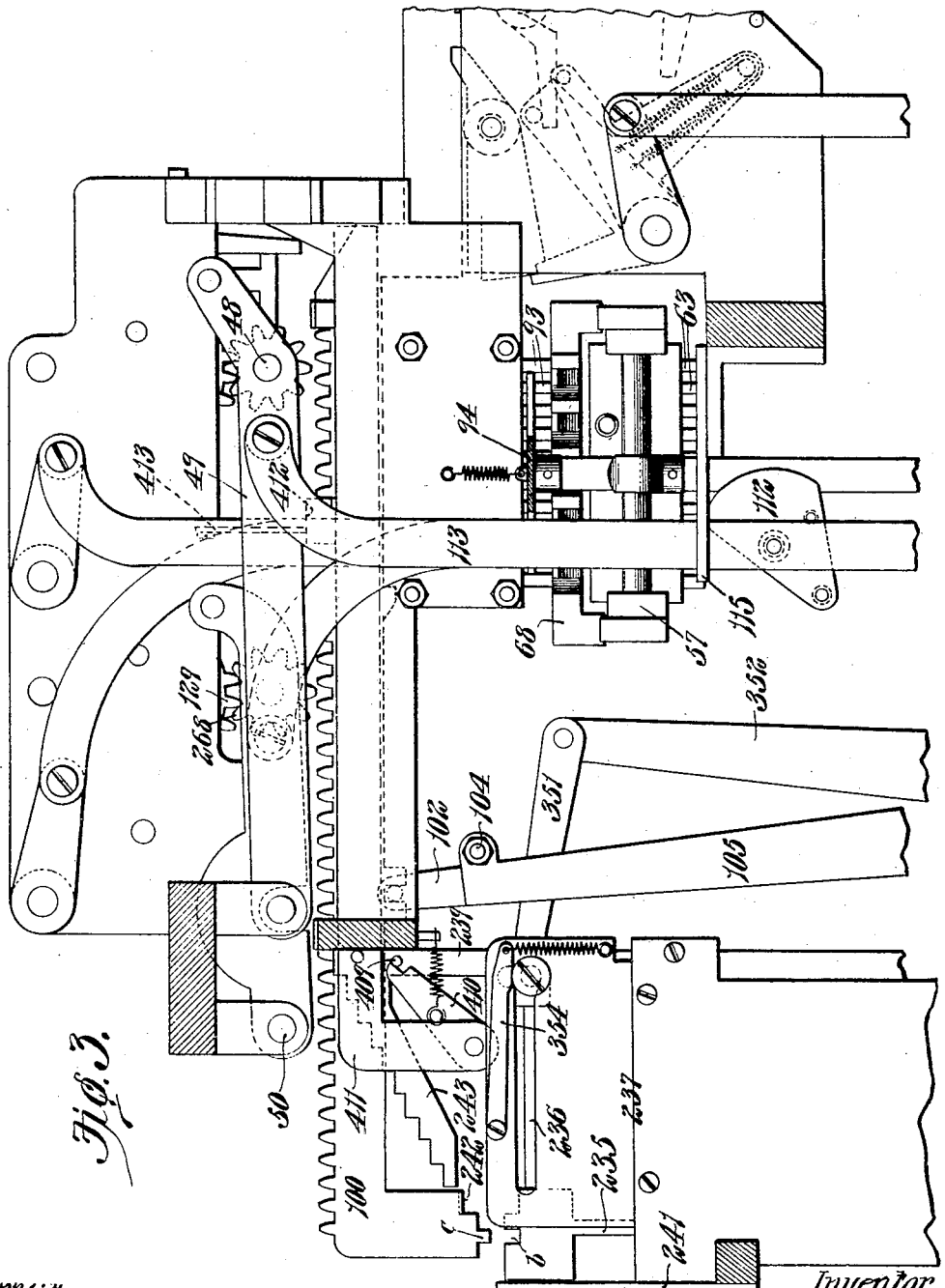

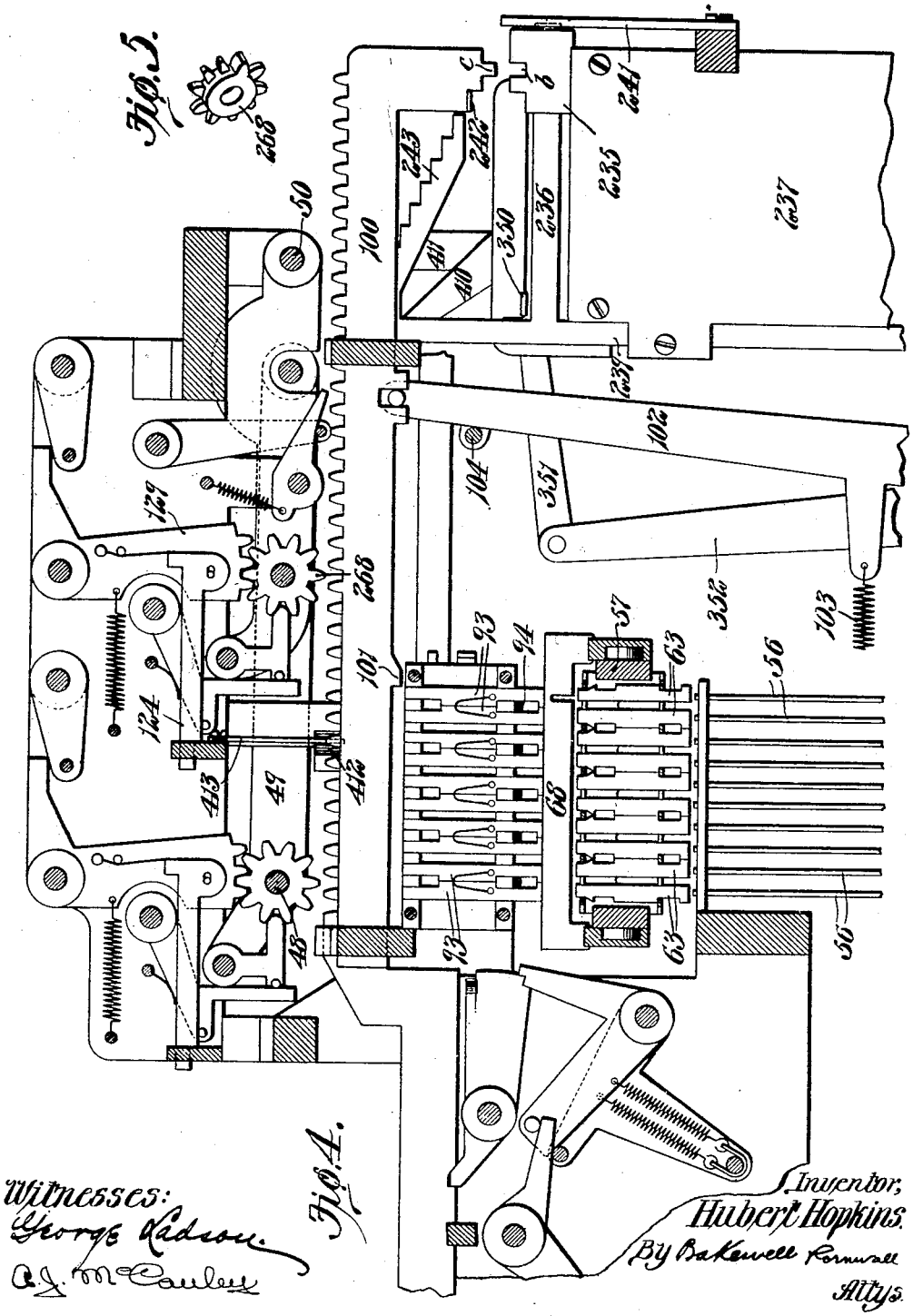

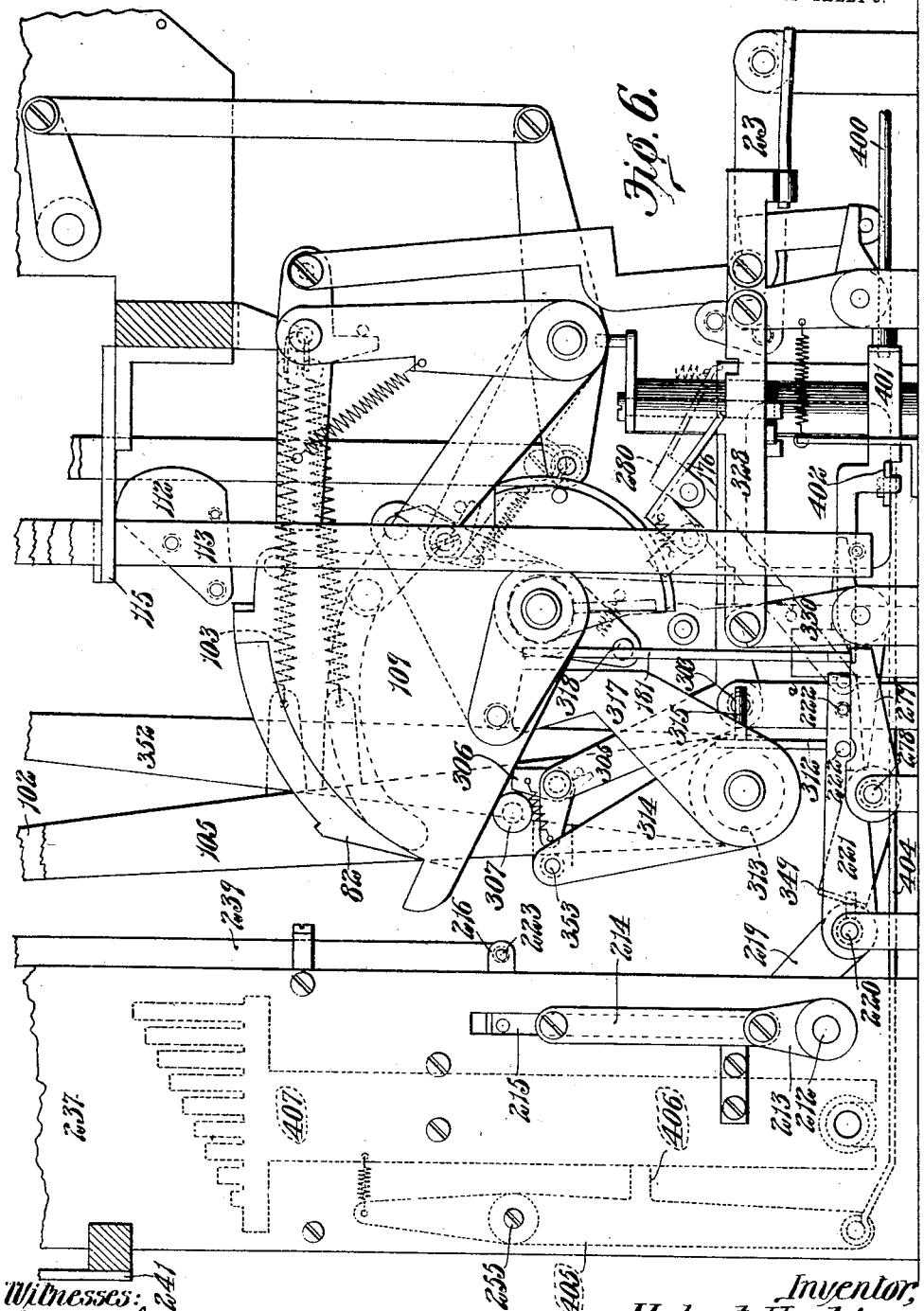

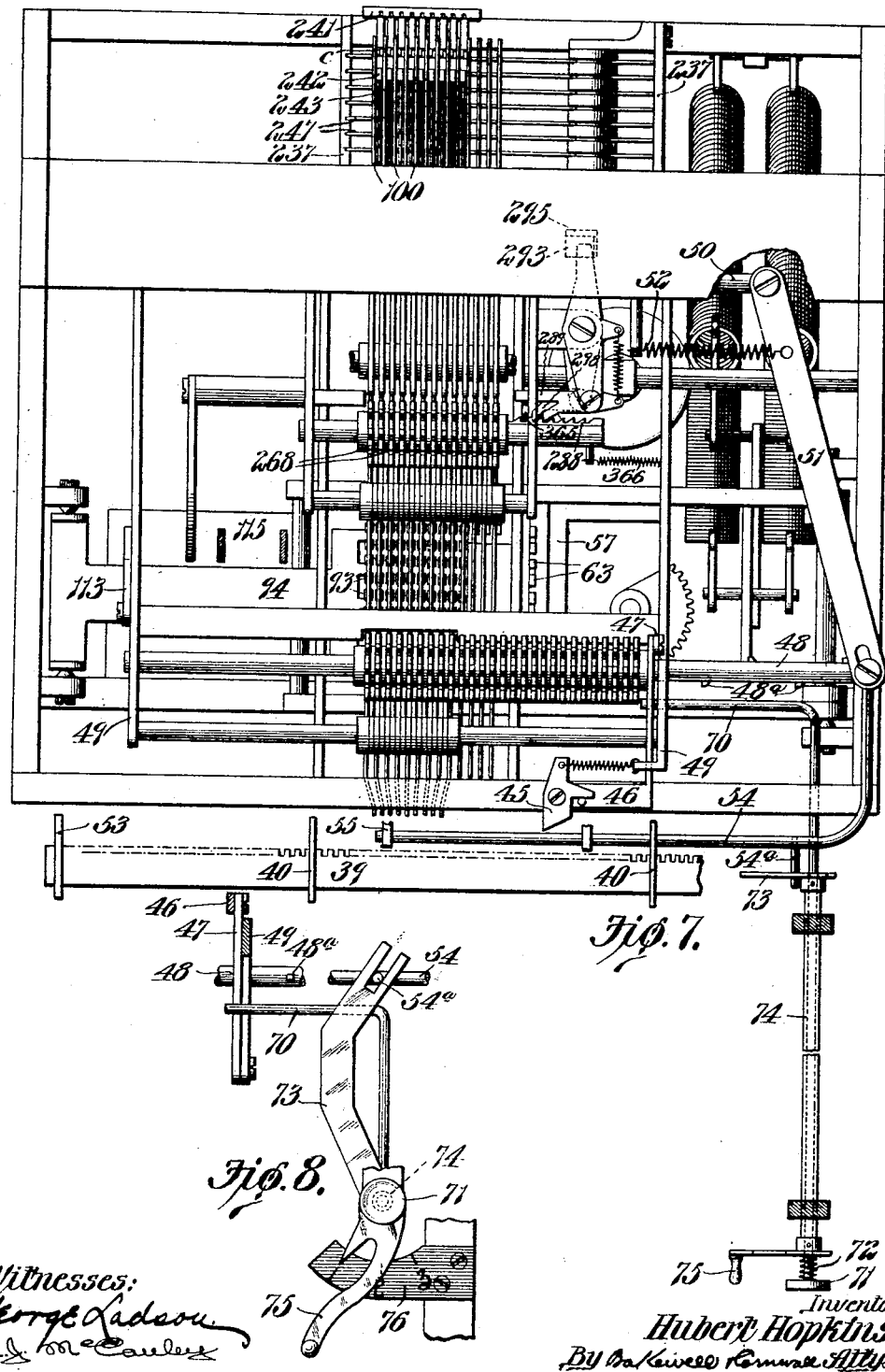

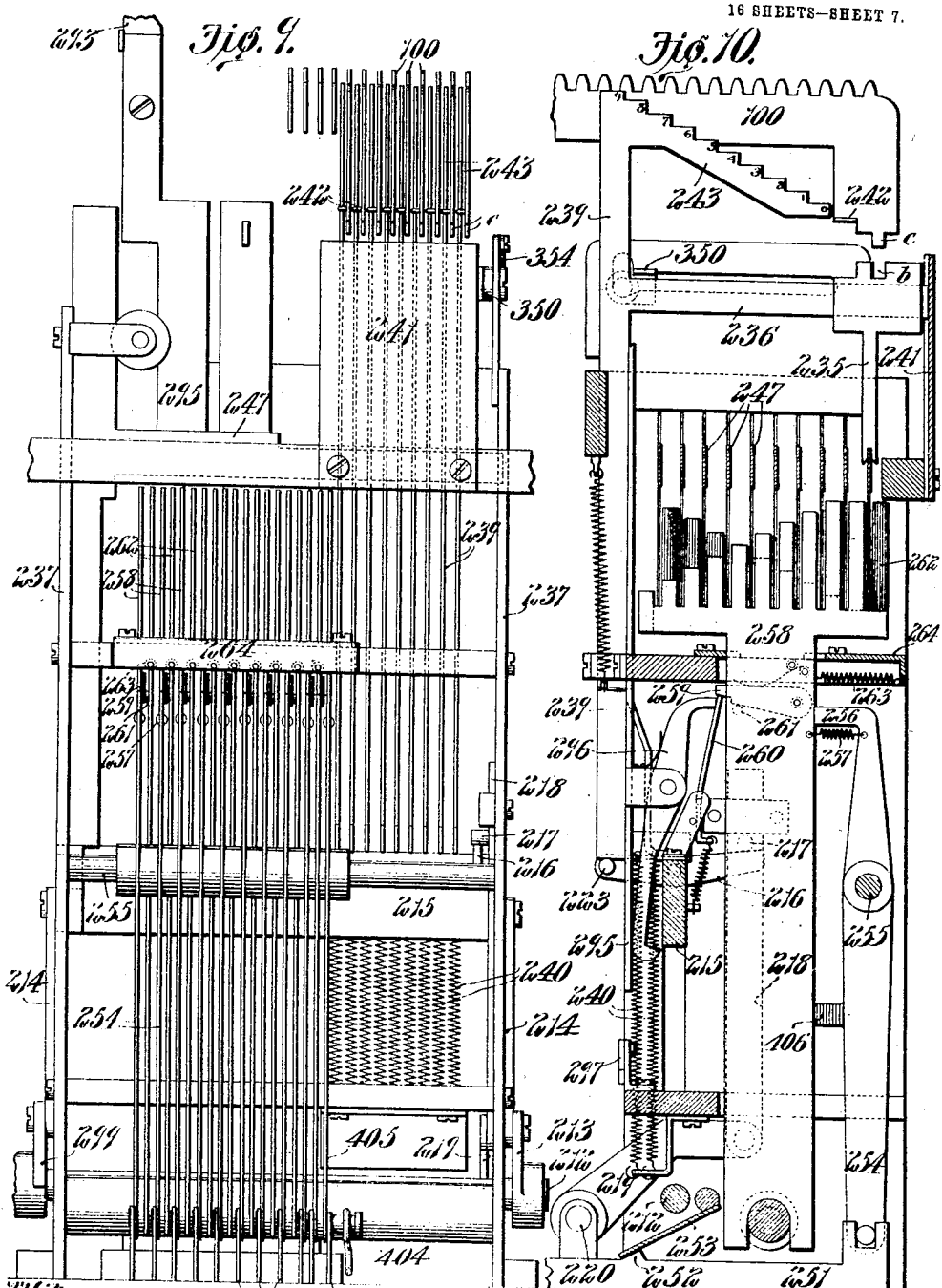

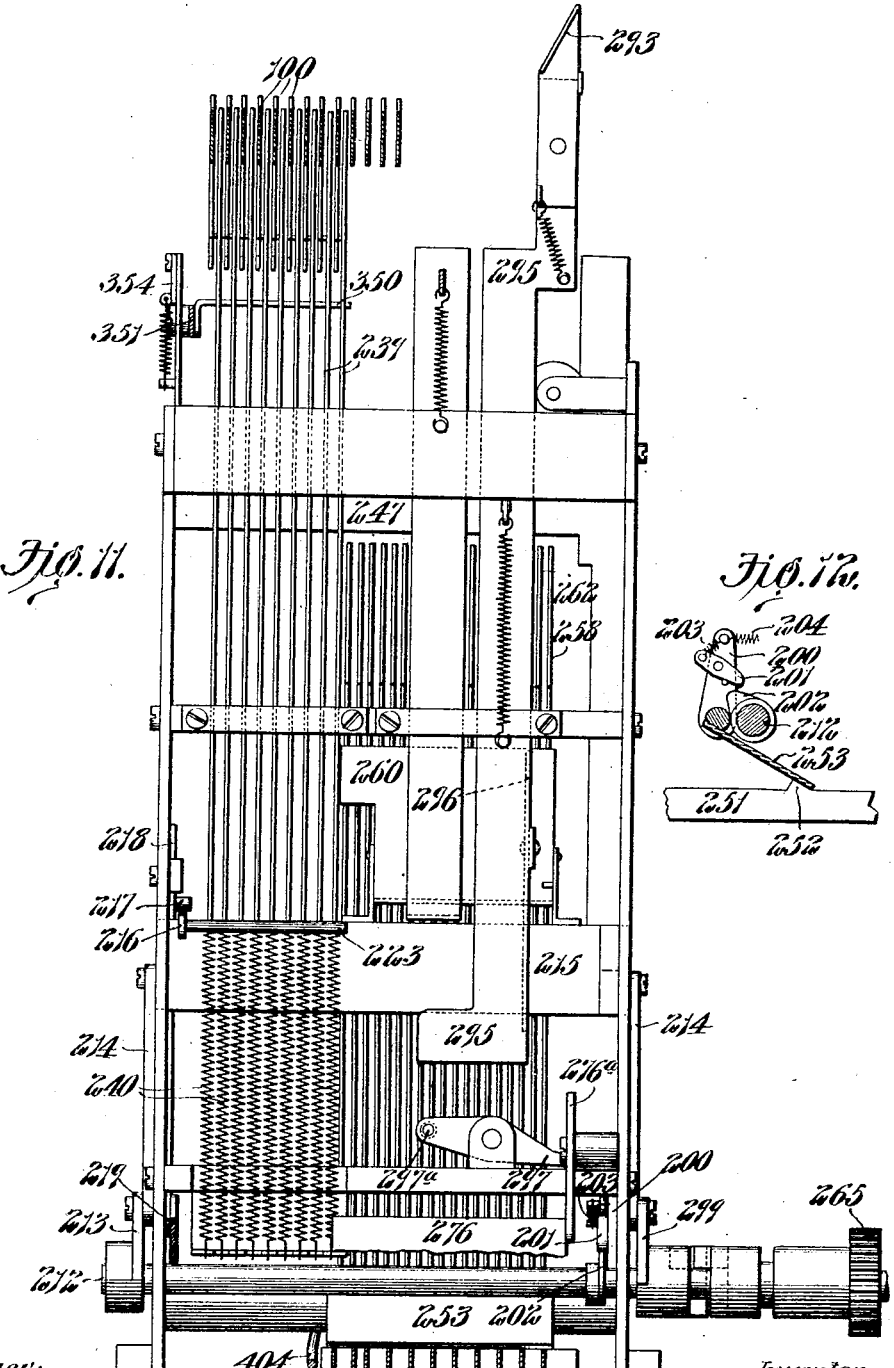

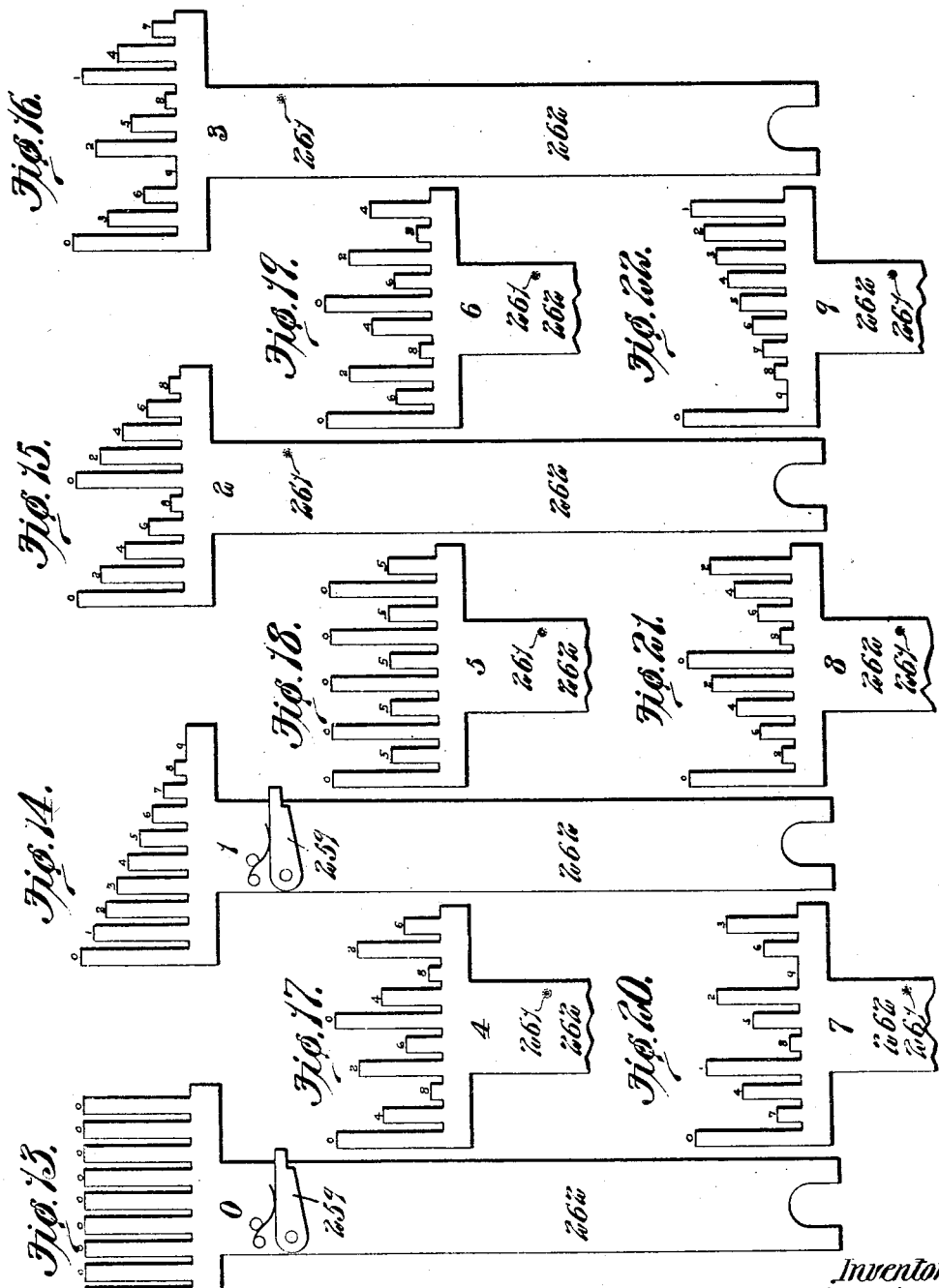

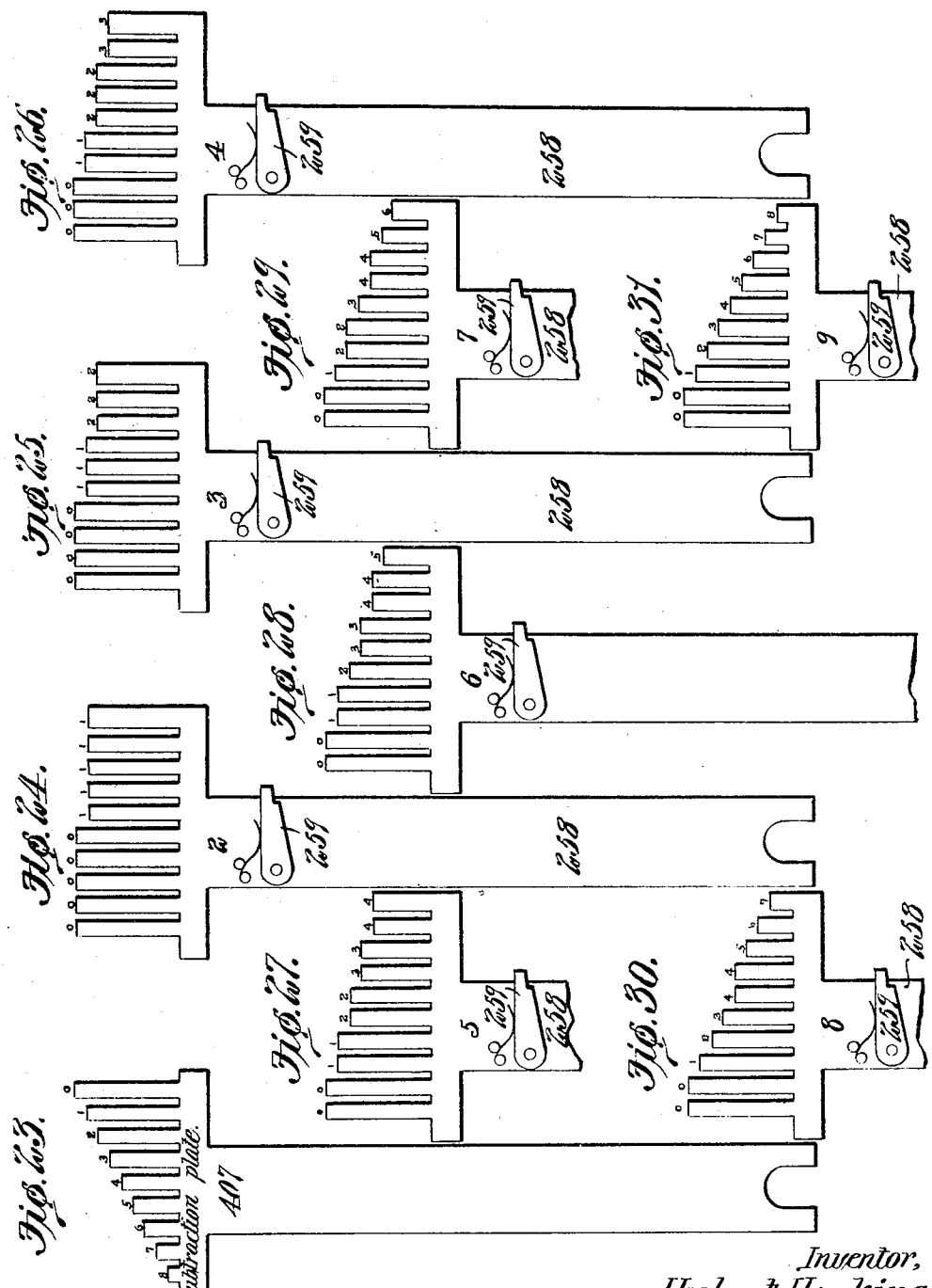

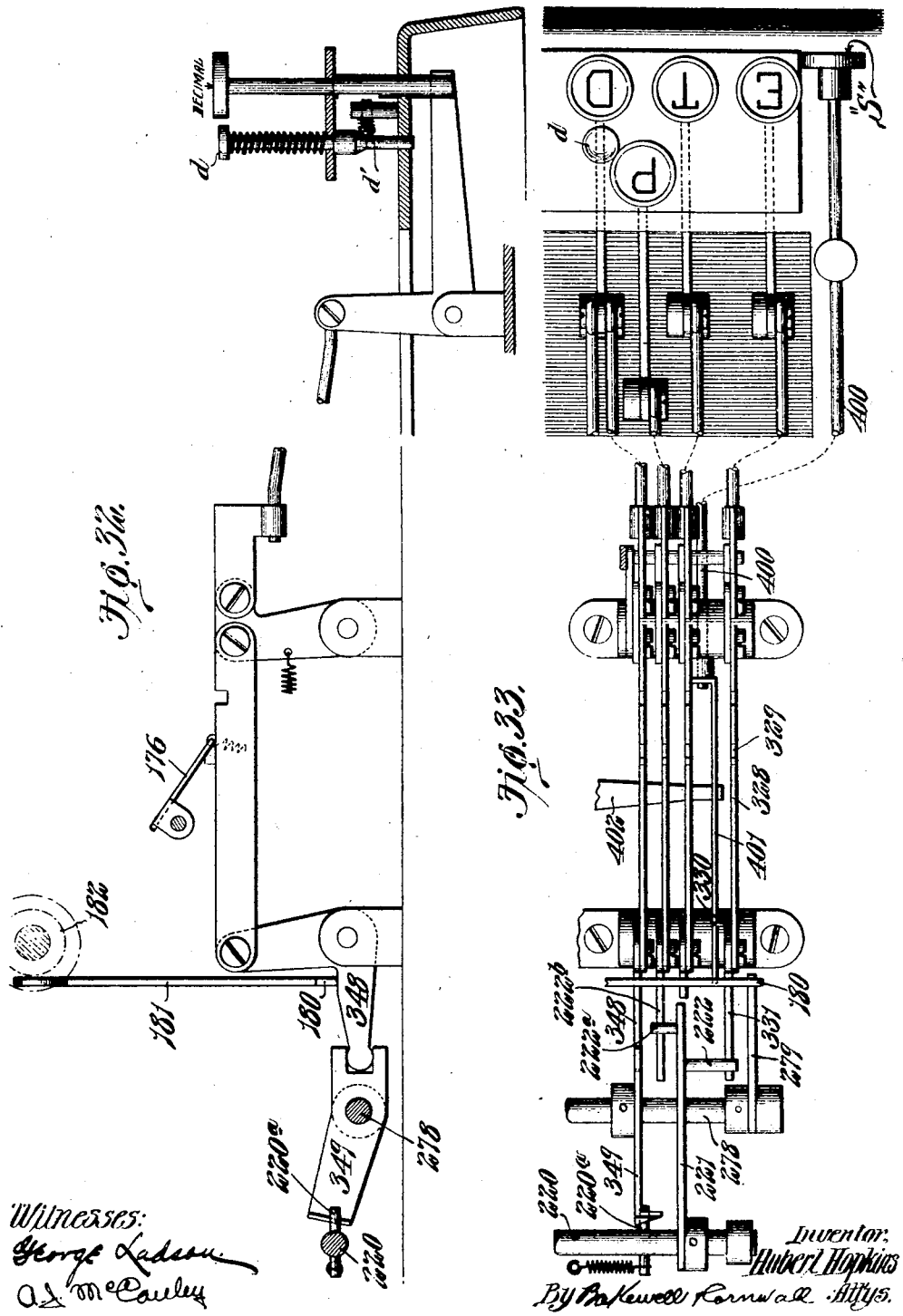

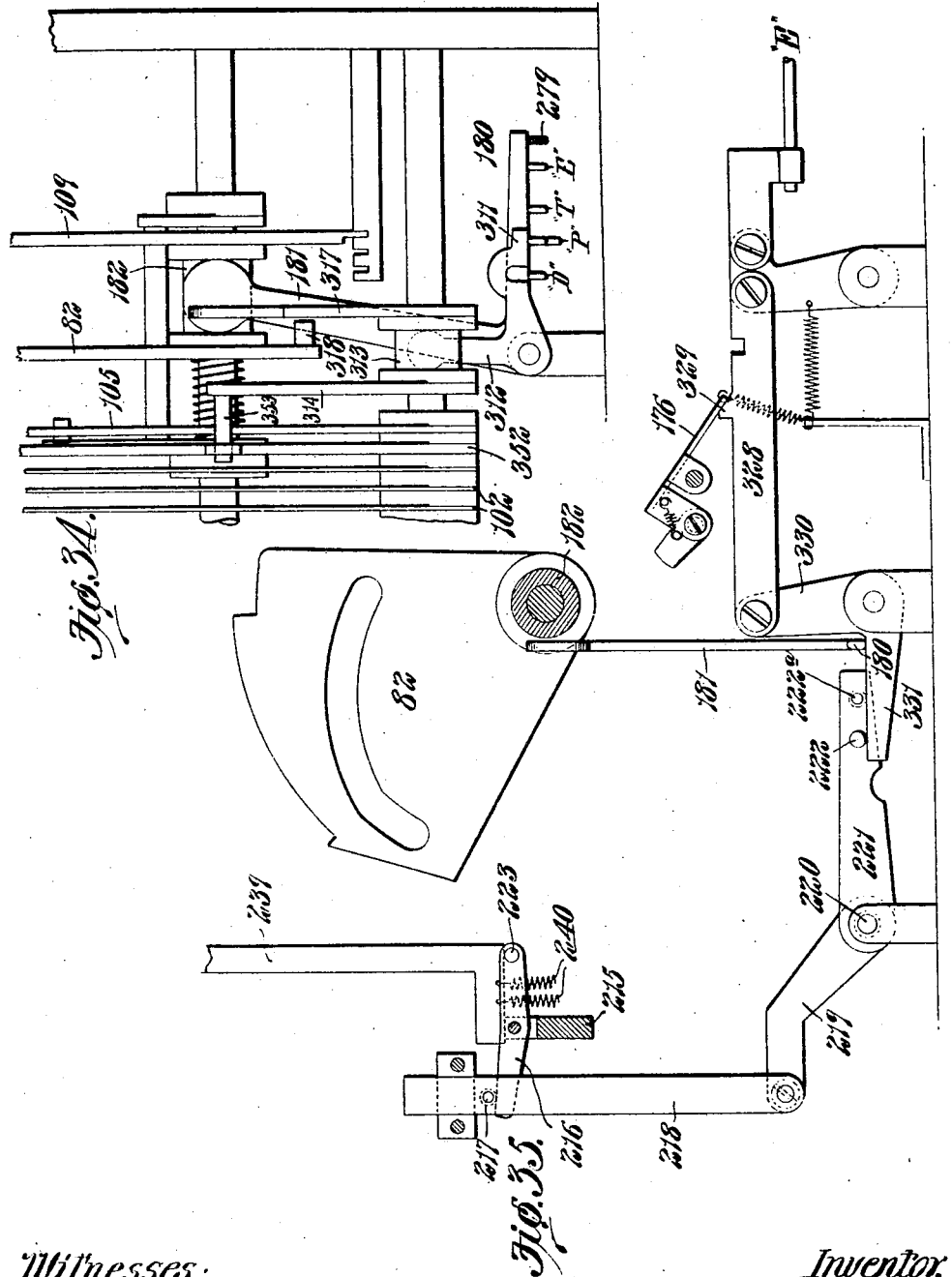

H. HOPKINS.
CALCULATING MACHINE.
APPLICATION FILED MAY 11, 1908.

1,118,489.

Patented Nov. 24, 1914.
16 SHEETS—SHEET 13.

Witnesses:
George Ladew
A. S. McCauley

Inventor,
Hubert Hopkins.
By Bakewell, Cornwall
Attys.

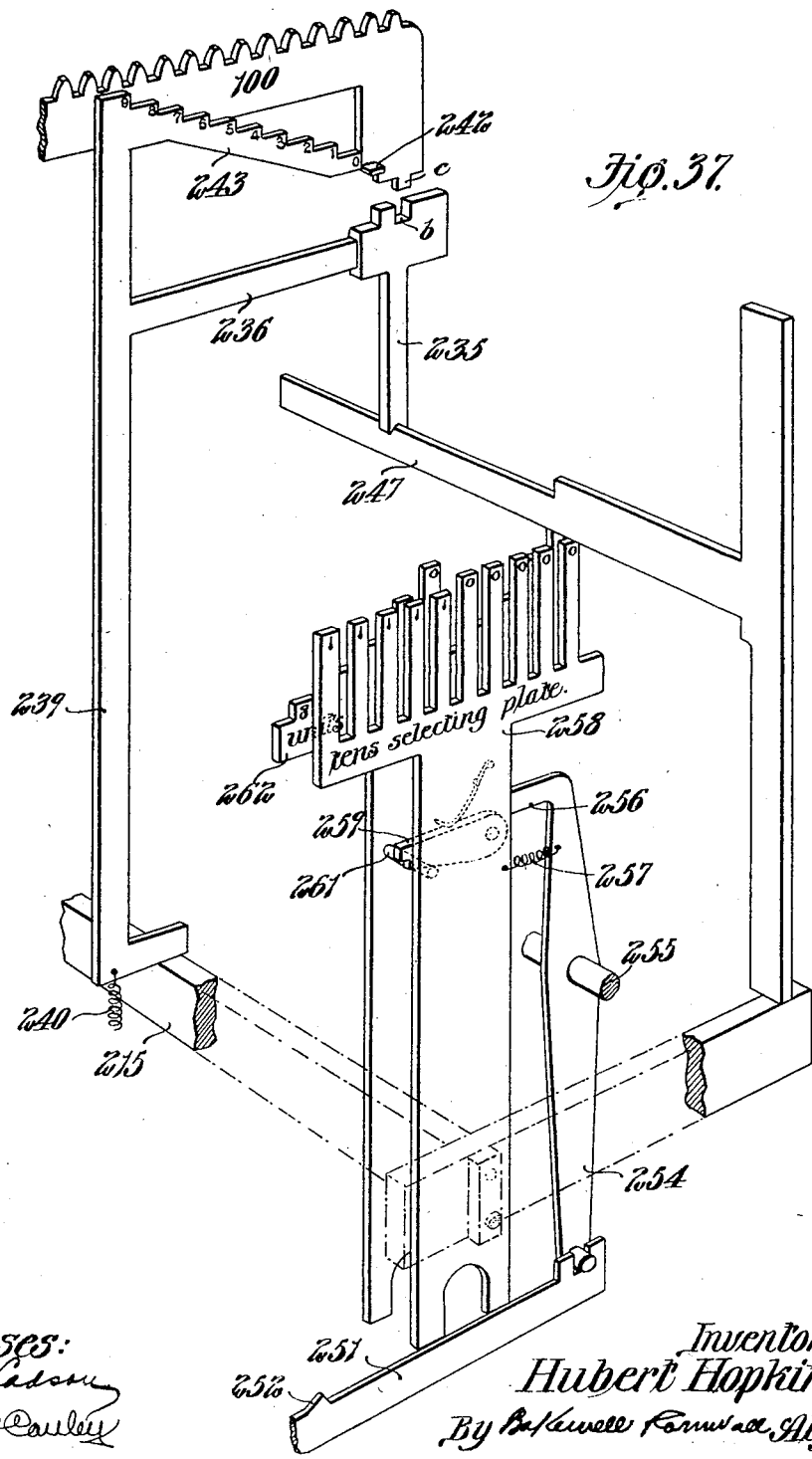

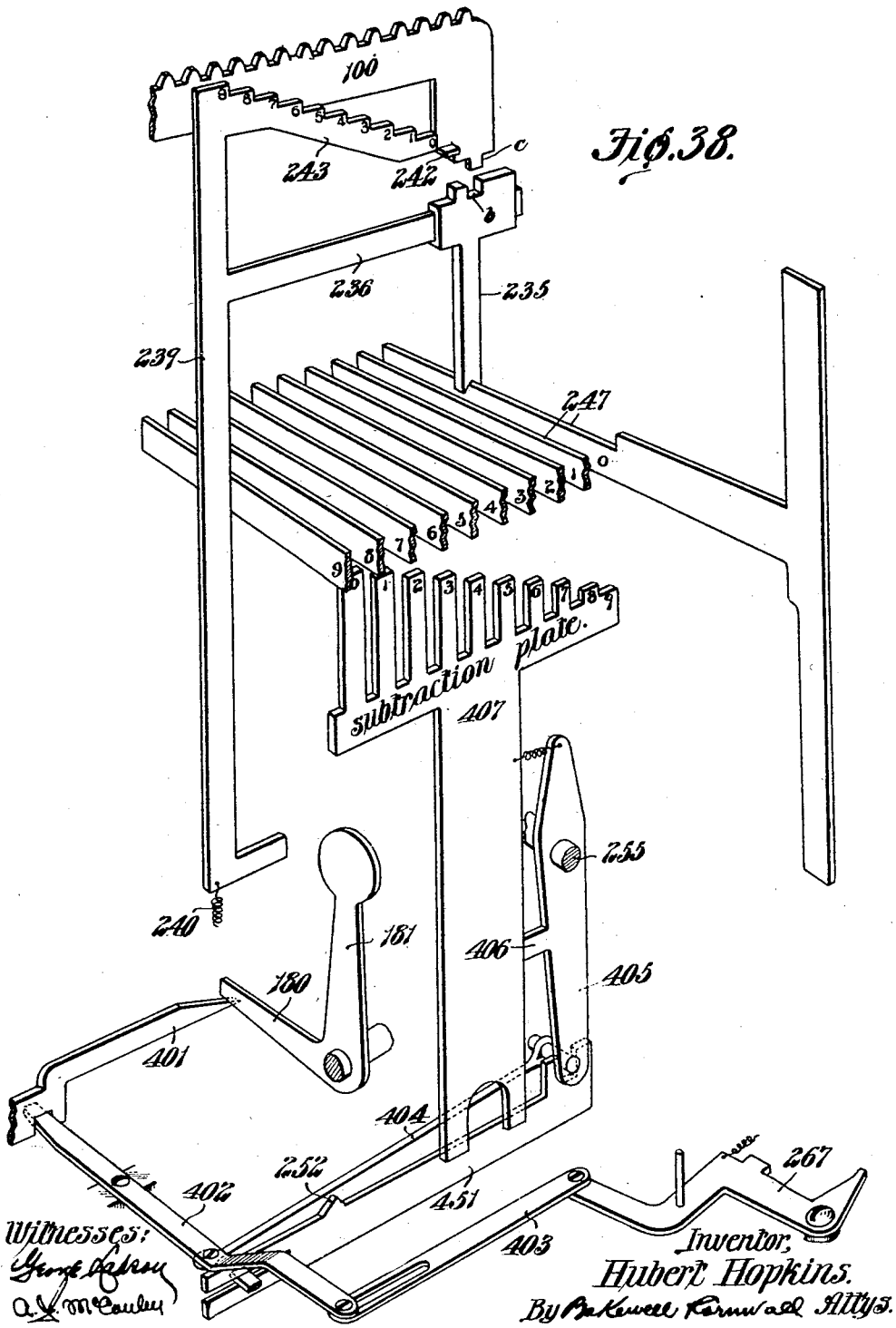

H. HOPKINS.
CALCULATING MACHINE.
APPLICATION FILED MAY 11, 1908.
1,118,489.
Patented Nov. 24, 1914.
16 SHEETS—SHEET 16.
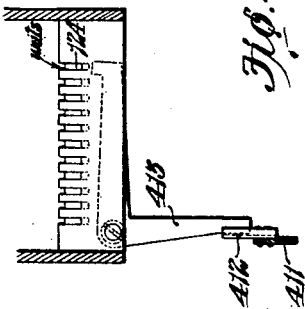
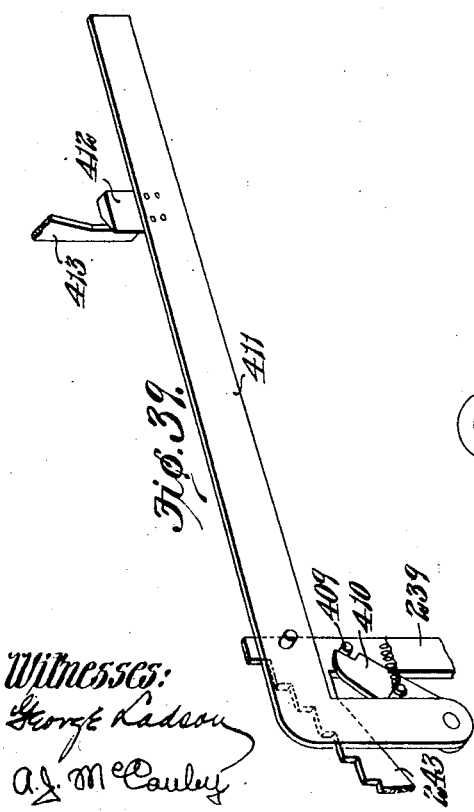
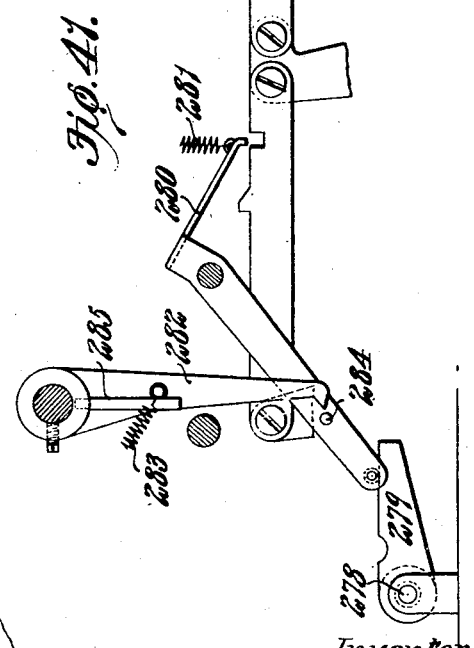
Witnesses:
George Ladson
A. J. McCauley
Inventor,
Hubert Hopkins.
By Bakewell Cornwall Attys.

UNITED STATES PATENT OFFICE.

HUBERT HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,118,489. Specification of Letters Patent. Patented Nov. 24, 1914.

Application filed May 11, 1908. Serial No. 432,166.

*To all whom it may concern:*

Be it known that I, HUBERT HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1:
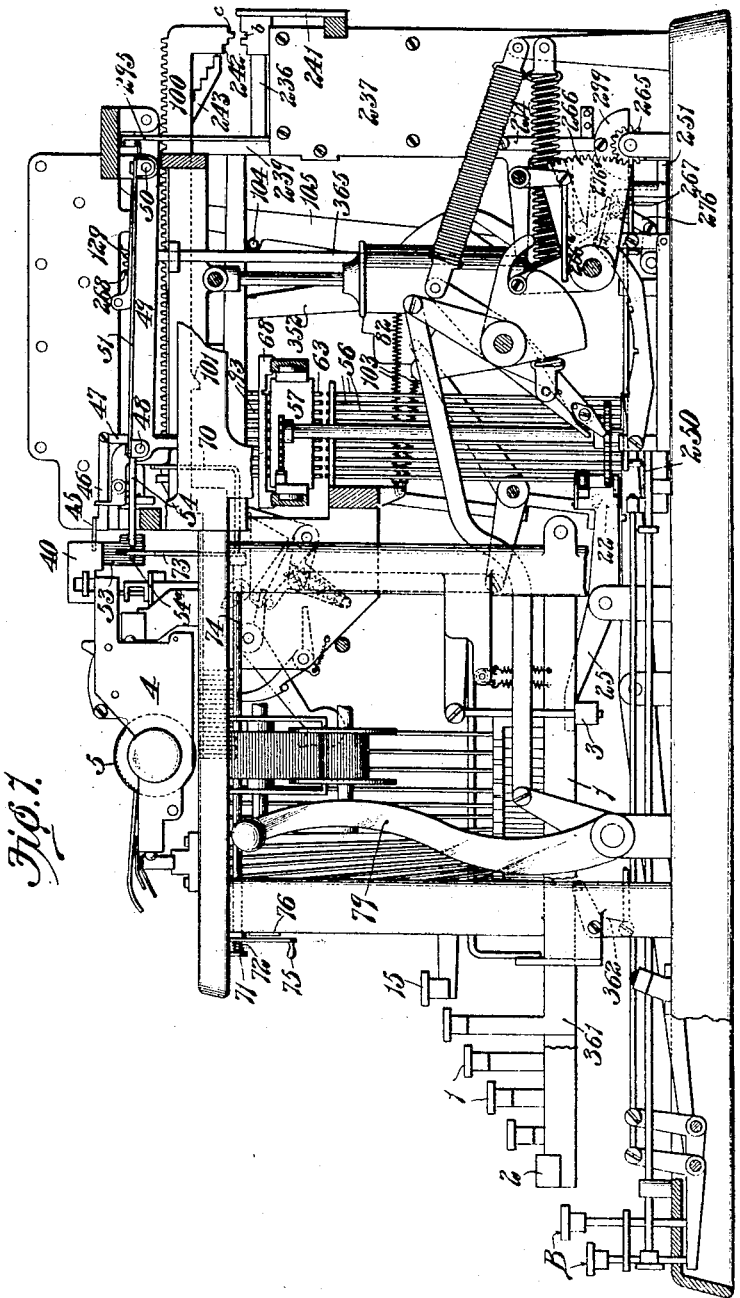
Figure 36:
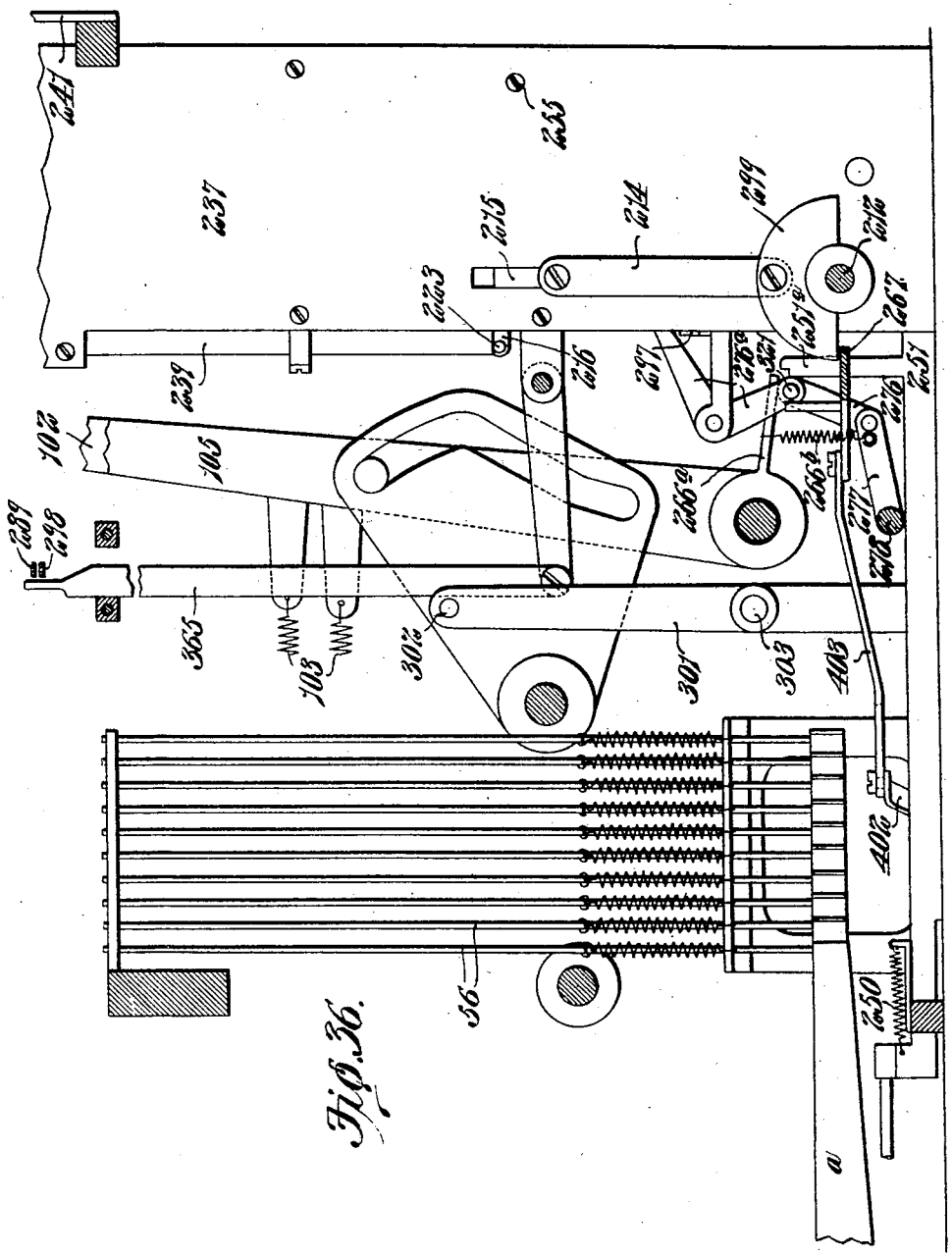

Figure 1 is a side elevational view of my improved calculating machine as seen from the right-hand side thereof; Fig. 2 is a plan view of the keys and key connections of the adding department of the machine; Fig. 3 is a side elevational view of the upper, rear portion of the machine as seen from the left-hand side of the machine; Fig. 4 is a vertical sectional view through the upper, rear portion of the machine; Fig. 5 is a detail view of one of the register wheels; Fig. 6 is a side elevational view of the lower, rear portion of the machine as seen from the left-hand side, this figure being complementary to Fig. 3; Fig. 7 is a top plan view of a portion of the machine; Fig. 8 is a detail view of the mechanism for indicating the position of the forward totalizers; Fig. 9 is a rear elevational view of parts of the multiplying mechanism; Fig. 10 is a vertical longitudinal sectional view through said multiplying mechanism; Fig. 11 is a front elevational view of part of the multiplying mechanism; Fig. 12 is a detail view of the mechanism for locking the multiplier keys against operation when one of said keys is depressed; Figs. 13 to 22 inclusive are detail views of the heads of the units multiplying plates, as seen from the left; Fig. 23 is a detail view of the subtraction plate as seen from the left; Figs. 24 to 31 inclusive are detail views of the tens multiplying plates as seen from the left; Fig. 32 is a detail view in side elevation showing the "D" or decimal key and its connections; Fig. 33 is a plan view showing the result keys and their connections; Fig. 34 is a rear elevational view showing the means for shifting the cam-operating plates; Fig. 35 is a detail view illustrating the connections of the "E" or extending key; Fig. 36 is a side elevational view as seen from the right of the lower rear portion of the machine; Fig. 37 is a diagrammatical view of certain of the multiplying devices; Fig. 38 is a diagrammatical view of certain of the multiplying devices which coöperate with the subtraction plate; Fig. 39 is a detail view showing the means for adding one to the sum of the minuend and the complement of the subtrahend; Fig. 40 is a detail view of the pawl which is operated by the mechanism shown in Fig. 39; and Fig. 41 is a detail view of the mechanism for locking the result keys against operation when the handle is in other than home position.

This invention relates to a new and useful improvement in calculating machines of the type shown and described in Belgian Patent No. 202,081, dated August 21, 1907, and also in an application serially numbered 310,739, filed by me in the United States Patent Office on or about April 9, 1906. Many of the features disclosed in this present application are claimed in the application for United States Letters Patent just mentioned, and therefore I do not claim the same here. There are shown in the accompanying drawings many features which will not be described in detail here because the same are fully described in said United States application and Belgian patent, to which latter patent, which is based on the identical machine disclosed in said United States application, reference is made for a more extended description, if such is needed, for a fuller understanding of the machine of this application. While the present improvements are designed to be applied to the machine shown in said patent and said application, it will be understood that by obvious modifications and changes many of these improvements could be applied to other types of calculating machines than the one herein specifically referred to. Therefore, I do not wish to be understood as limiting my invention to the type of machine herein shown, as several of the features herein disclosed are broadly new, and the principles of operation and equivalent constructions could be utilized to advantage in connection with other types of calculating machines.

The objects of my present invention are:
1. To provide means for manually positioning the forward totalizers independently of the typewriter carriage and indicating their position. 2. To simplify the multiplying mechanism and to cause certain of the parts thereof to move downwardly instead of upwardly as in the aforesaid patent. 3. To provide means for throwing all the multiplying devices out of operation during the ordinary operations of addition. 4. To provide means for preventing operation of the multiplier keys when one of said keys is depressed. 5. To provide means for retaining the multiplicand in the multiplying devices. 6. To provide means in the multiplying mechanism whereby the operation of subtraction may be performed. 7. To provide locking devices whereby untimely operation of the said parts or keys of the machine is prevented.

With these objects in view, my invention consists in the construction, arrangement and combination of the several parts, all as will be hereinafter described and afterward pointed out in the claims.

*The typewriting mechanism.*—In the accompanying drawings, referring to Fig. 1, there is shown a typewriting mechanism of which 1 indicates the keys and key bars. 2 is the spacing key of the typewriting mechanism, and 3 is a spacing bar controlling the escapement mechanism of the typewriter carriage. 4 is the frame of the typewriter carriage, in which is mounted a platen 5. Means are provided for manual rotation of this platen, as in line-spacing, and also mechanical rotation in line-spacing, where a record is being made by the printing devices of the adding mechanism of the machine. An escapement bar is provided whereby the carriage may move step-by-step laterally in letter or figure spacing, and tabulating keys 15 are provided whereby the carriage may be arrested to predetermined lateral positions for work of tabulation.

The typewriting mechanism of my present machine may, in addition to the essential features of such a mechanism, heretofore described, also be provided with such additional features as may be desired or useful. I deem it unnecessary to give a more detailed description of the typewriting mechanism here, as a reference to the before-mentioned patent will give a full and clear explanation of the same.

*The adding mechanism.*—The keys in group A (see Fig. 2) which are identified with the adding mechanism, are connected to a series of bars $a$ which are mounted upon a common pivot 21, said bars to the rear of said pivot having their ends deflected so as to lie in a straight line under a longitudinal row of independent vertically-movable bars 56 which coöperate with the setting up pins 63 of the carriage 57. The rear ends of these bars $a$ extend under a plate 22 pivotally mounted in the free end of a yoke frame 23 which has a forward extension 25 arranged above the spacing bar 3 of the typewriter. In this manner the operation of any of the keys in group A will depress the bar 3 and actuate the escapement mechanism of the typewriter carriage, causing the carriage to move laterally step-by-step a number of spaces equal to the number of figures set up on the keys of group A. The operation of the carriage escapement from the keys in group A is particularly useful in lineal addition as it is only necessary to strike the space key once after the printing of each number.

Means are provided for locking the carriage against lateral movement in order that vertical columns of figures may be printed, but it is unnecessary to describe these means here in detail. Means are also provided for rotating the carriage in the operation of printing numbers one under the other in column formation, but it is unnecessary to describe such mechanism here as the same is fully set forth in the before-mentioned patent.

*Controlling the position of the forward totalizers from the typewriter carriage.*— Referring to Fig. 7, 39 indicates a bar which is carried by the typewriter carriage and whose rear end is provided with a series of notches in which may be adjustably mounted a series of blocks 40. There are preferably two of these adjustable blocks 40 which are designed to coöperate with a tappet 45 mounted on a sliding bar 46. This bar is connected at its rear end to an escapement lever 47, which escapement lever, when vibrated, permits the forward totalizers to move from right to left as fully set forth in the patent aforesaid. 48 is a shaft on which the forward totalizers are mounted, said shaft finding bearings in two frame plates 49 pivoted at their rear ends to the shaft 50. Shaft 48 is provided with escapement teeth 48$^a$. 51 indicates a lever pivoted to the end of shaft 50, its free end being pivotally connected to the end of shaft 48. A spring 52 tends to draw the lever 51 toward the left, and consequently whenever lever 47 is vibrated the escapement mechanism will operate to permit the shaft 48 and its carried totalizer wheels to move under the action of spring 52. Thus if the typewriter carriage is moving toward the left, and one of the blocks 40 should strike the inclined face of tappet 45, the bar 46 would be forced rearwardly, operating the escapement mechanism, displacing the totalizer which was in operative position with respect to the rack bars, and arranging in operative position the next or middle group of totalizers at the right. If now the next block 40, in the continued step-by-step movement of the typewriter carriage to the left, strikes the inclined face of tappet 45, the escapement mechanism would again be operated so as to displace the operative group of totalizer wheels and bring into operative position the next operative group of totalizer wheels at the right. By adjusting the blocks 40 the escapement mechanism may be operated at different positions of the typewriter carriage. As it is necessary to restore the groups of totalizer wheels to their initial position when the typewriter carriage is restored, means are provided for accomplishing this, which means consists of a block 53 similar, so far as its adjustable feature is concerned, to the blocks 40. Block 53, however, is provided with a downward extension, see Fig. 1, which coöperates with the end of a rod 54 mounted in suitable guides 55 extending from the frame plate of the typewriting machine. Rod 54 is connected to shaft 48, and consequently when the typewriter carriage is moved from left to right the downward extension on block 53 engages the rod 54 and restores the totalizers to their first position at the right. If it is desired not to position the forward groups of totalizers upon the movement of the typewriter carriage, blocks 40 may be detached from the bar 39.

*Means for manually positioning the forward totalizers and indicating their position.*—70 indicates a bar whose inner end is bent to engage a lever 47 which carries the escapement teeth coöperating with the teeth 48$^a$ on the sliding shaft 48. The forward portion of this bar 70 extends through a tube in the frame of the typewriting machine, its end being provided with a button 71, a spring 72 tending to hold the bar in its forward position. When, however, the operator presses the button 71, the lever 47 (and its connected tappet 45 and bar 46) is operated the same as by the blocks 40 carried by the typewriter carriage, and the forward totalizers will be repositioned. To illustrate, if the totalizer stood in the position shown in Fig. 7 and the button 71 was depressed once, the left-hand group of totalizer wheels would be displaced from operative position, and the middle group made to occupy operative relationship to the actuating devices. If now the button 71 was depressed a second time, the middle group of totalizer wheels would be displaced and the right-hand group made to occupy operative relationship to the actuating devices. Of course, this manual positioning of the forward totalizers is entirely independent of the typewriter carriage. It will be understood that when the typewriter carriage is at the extreme right, in which position the block 53 will prevent the movement of the rod 54, the forward totalizers cannot be positioned to change the operative relationship existing between the left-hand group of totalizer wheels and the actuating devices. To restore the forward totalizers to their initial position independently of the typewriter carriage I arrange a rock arm 73 whose upper end is preferably slotted (see Fig. 8), in which slot extends a pin 54$^a$ which is a part of the rod 54. Rock arm 73 is fixed to the inner end of a sleeve or tube 74 through which the rod 70 extends, and on the forward end of this sleeve or tube is mounted a handle 75 which may be grasped by the operator for the purpose of operation. This handle 75 is provided with a pointer which coöperates with a scale 76 mounted on the frame of the typewriting machine, said scale having the numerals "1", "2" and "3" indicating respectively the left-hand, middle and right-hand groups of forward totalizers.

*Introducing an item into the forward totalizers.*—When any of the keys in group A is struck, the bar 56 before referred to is raised, and in turn this bar raises one of a series of setting up pins 63 arranged in the traveling carriage 57. There is an escapement mechanism operated by the rear end of yoke 23, which escapement mechanism controls the travel of the carriage from right to left, which travel is caused by a spring, not shown, which is connected to said carriage. At each depression of a key the carriage travels one step leftward from a lower to a higher order, various pins being positioned by the several bars 56 according to the key struck.

The above constitutes what may be designated "setting up devices" and in setting up an item it is only necessary to strike the keys in succession, beginning with the highest denomination. After an item has been set up on the keys, the operating handle 79 is operated, which causes the traveling carriage to be bodily lifted, the elevated pins 63 positioning corresponding stop pins 93 in their paths. After the pins 93 have been positioned the carriage is depressed and restored to home position, movement to home bringing all of the elevated pins 63 into engagement with a cam bar 68, which restores the elevated pins 63 to their normal position. At the time that the traveling carriage is being restored, the operating handle rocks two main levers 105 forward, which levers carry a restoring bar 104. This restoring bar, as shown in Figs. 1, 3 and 4, lies in front of rocking levers 102 which have slot and pin connections with the rack bars or actuators 100. Springs 103 are connected to levers 102 and tend to move them forward at all times. Shoulders 101 are provided on the rack bars 100, which shoulders come in contact with any of the pins 93 which may have been raised, thus arresting the movement of the rack bars, but permitting the restoring bar to move forward its full stroke under the control of the operating handle. To prevent forward movement of the idle rack bars, the zero row of pins 93 (being the rearmost row of pins) are elevated by means of a plate on the traveling carriage, not shown, which plate raises all of the zero stop pins to the left of the highest series containing an actuated pin, whereby all of the rack bars of higher denomination are prevented from movement, and only those which are to be active are permitted to move forward to positions determined by the elevated stop pins of a higher order than zero. A comb plate 94 is operated when the handle starts on its return movement to restore the pins 93. On the return movement of the handle the restoring bar 104 picks up all of the levers 102 and moves them and their complementary rack bars rearwardly. When the handle starts on its rearward movement cam plate 109 coöperates with a tappet 112 mounted on a bar 113 and coöperating with a plate 115, said bar being connected to a swinging frame plate 49 in which the forward totalizers are mounted. In this manner the forward totalizers are brought into engagement with the racks when the racks are moving rearwardly, and the item set up on the keys in group A is thus introduced into the group of forward totalizers in operative relation to the actuating racks.

*The carrying devices.*—The carrying devices, the printing mechanism, the manner of taking a total from the forward totalizers, the mechanism for cushioning and compelling a full stroke of the handle, and the error key mechanism are substantially the same in all respects as the corresponding parts shown and described in the beforementioned patent, and therefore I deem it unnecessary to give a detailed description of the same here.

*Placing a multiplicand in the multiplying devices.*—Operating any of the keys in group A and depressing the "E" key will place the number so set up in the keys of group A in the multiplying devices. The "E" key in the present construction does the work of the "R" key mentioned in the aforesaid patent, and consequently I do not employ an "R" key in this present construction. When the "E" key is depressed (see Figs. 6 and 35) it accomplishes the following: The link 328 carrying the shoulder 329 rides under the detaining plate 176 and prevents the "E" key from rising until the handle has been moved forward and starts on its return stroke. This construction is fully set forth in the patent aforesaid. The bell crank lever 330 lying under the bell crank lever 180—181 causes the said bell crank lever to be operated and the cams 82 and 109 connected to the sliding hub 182 to be shifted so that when the handle is pulled and said cams are moved laterally their paths of movement will not include any of the pins on the tappets 112, etc., and consequently none of the register wheels will be thrown into engagement with the actuating racks. The extension 331 lying under pin 222 on a rock arm 221 will rock shaft 220, which shaft carries a rock arm 219 lying adjacent one of the side plates 237 of the multiplying mechanism (see Figs. 6 and 35). This arm 219 carries at its free end a link 218, which link is provided with a pin 217 arranged above the inner end of a lever 216 pivoted to a vertically movable head piece 215 operating in vertical slots in the frame plates 237 and supported upon the upper ends of links 214 connected to rock arms 213 arranged on a shaft 212. The forward end of the lever 216 is provided with a bar 223 which lies under a series of stepped stop bars 239, which are held down by springs 240, and are provided with horizontal members 236, which members are guided in vertical grooves in a plate 241.

All of the rack bars which are controlled by stop pins 93 are provided with pins or projections 242 at their rear ends which coöperate with shoulders on the upper side of the rearwardly extending stepped portion 243 of stop bars 239. There are ten of these stopping faces upon this extension 243 including the rear end of said extension which normally lies above the projection 242. It will be obvious that if the bars 239 are lowered so that the ends of their extensions 243 lie in the paths of the projections 242 of the racks, said racks, if released, cannot move forwardly because of the presence of the zero stop (the end) of the extensions 243. If, however, any of the bars 239 are lowered, say for instance one step, the pin 242 will coöperate with the first shoulder, and so on up to the highest shoulder which is the "9" position of the stop bar. For convenience of reference the shoulders of the stop bars in Fig. 10 have been numbered according to the positions they permit their coöperating rack bars to occupy when the projection 242 comes in contact with said shoulders.

To return to a recital of what occurs when the "E" or extending key is depressed, I will state that when the rock shaft 220 is rocked the bar 223 is lifted, which raises all of the bars 239 together with their associate parts. On the horizontal extensions 236 of the bars 239 are sliding pendants 235, which pendants are provided with notches in their lower ends, and also notches in their upper ends, the latter being marked *b* for convenience of reference. Each of the key-controlled rack bars is provided with a tooth or downwardly extending projection *c* at its end which fits into the recess of its complementary pendant whenever the bars 239 are lifted, thus establishing a connection between the rack bars and the pendants, and breaking the connection between the pendants and the cross arms 247, whenever the "E" key is depressed.

A number can, when the "E" key is depressed, be set up in the multiplying devices either directly from the keys in group A by depressing the "E" key before or after the example is set up on the said keys, or if the number to be multiplied has been registered in any one of the forward totalizers it can be transferred to the multiplying devices by simultaneously depressing the "E" (extending) and "T" (total) keys and pulling the handle. In the first instance, in the direct introduction of a number into the multiplying devices from the keys said number is not registered in any of the totalizers. In the second place, where the number has been registered in the forward totalizers, the act of transferring that number to the multiplying devices may clear the forward totalizer, if the total key is permitted to rise when the handle reaches its forward limit of movement, or the number may be retained in the forward totalizer by holding the total key down during the rearward movement of the handle. If by mischance an error is made in the number introduced into the multiplying devices, and it is desired to clear the multiplying devices, the "P" (product) key may be depressed and the handle operated, which will result in restoring all of the pendants to their normal (zero) position. Remembering that the positioning of the pendants 235 is under the control of the operator, and that the number to be multiplied (the multiplicand) is set up in this field of pendants similar to the setting up of the stop pins 93, and that these pendants remain set in position in order that the number represented by them may be multiplied by any digit one or more times, it will be obvious that when the cross arms 247 are lowered the pendants will also be lowered one or more steps, and consequently stops will be placed in the paths of the projections 242 of the rack bars so that said rack bars will be arrested in positions determined by the positions of the steps on the stop bars. The amount of depression of the cross arms 247, their coöperating pendants and stop bars 239 carried thereby is controlled by selecting plates illustrated in Figs. 13 to 31 inclusive.

In the patent hereinbefore mentioned the selecting plates were bodily raised to lift the cross arms 247 and the stop bars 239, but in the present instance the selecting plates are pivoted at their lower ends on a fixed pivot and normally lie with their vertical grooves in registration with the paths of movement of the cross arms so that when said cross arms are depressed they will normally pass freely into said grooves. When, however, one of the multiplying keys is operated (the multiplying keys are those comprehended within the group B) the operated multiplying key will move forward a plate 251, which plate is provided with a shoulder 252 riding under a detaining plate 253. The rear end of bar 251 has a slot and pin connection with a lever 254 pivotally mounted on a shaft 255, and whose upper end is provided with a stop projection 256 which coöperates with the shank of its complementary selecting plate which is held against said stop projection by means of a spring 257. Thus whenever the bar 251 is moved forward upon the operation of one of the multiplying keys, the selecting plate 258 connected thereto is tilted to the rear, locating its stop projections in the paths of movement of the cross arms 247. When the handle is operated and the cross arms 247 depressed they will be arrested respectively on the upper ends of the projections carried by the selecting plates which have been placed in their paths, and consequently the stepped shoulders on the extension 243 will be properly positioned with respect to the projections 242. It might be well at this point to state that the method of multiplication followed by the mechanism of the machine under consideration is the same as that in the before-mentioned patent, that is, the tens and units partial products are determined and added together in the rear totalizer, giving the correct and complete product of any number represented by the pendants which is multiplied by any digit or series of digits set up on the multiplier keys. It might also be well to state that whenever a multiplicand is set up in the multiplying devices and it is desired to multiply the same by some number, the digits constituting the number are successively set up on the keys in group B beginning with the digit of highest order and operating the handle twice for each successive digit, with the exception of the zero character and the "1" key, which require only a single operation of the handle.

The multiplying selecting plates with the exception of the zero and "1" selecting plates are arranged in groups of two, these plates being complementary to each other to the extent that one plate (the one carrying the pawl) represents the tens of the partial product, and the other (the one carrying the pin) the units of the partial product. For convenience of reference each plate has been marked with the digit it represents in the multiplying operations. When the handle is operated in the operations of multiplication the first operation of the handle is for the purpose of obtaining tens partial product, as it is the tens plate which is primarily displaced by the operation of any multiplier key, while the second operation of the handle serves to restore the tens plate and place in operative position the units plate, whereby the units partial product may be obtained from the complementary units plate. In the multiplication of any number by another the product must be units, tens or other digits of higher denomination. The tens multiplying plates have only to do with the tens partial product, as, for instance, when "654" is multiplied by "9", the separate product of each digit in the multiplicand contains tens and units, as when "4" is to be multiplied by "9" the product contains three tens and six units; when "5" is multiplied by "9" the product contains four tens and five units, and when "6" is multiplied by "9" the product contains five tens and four units, etc. In a case where the product is less than ten, as for instance when "2" is multiplied by "2", there would be no tens but four units; or when "5" is multiplied by "3" there would be one ten and five units. If there are no tens in the product, or if there is one or more tens in the product, the tens plate is so constructed as to position the proper cross arms 247, irrespective of the particular pendant which may be in connection with said arms. In this manner the stepped stop bars 239 are accordingly positioned, and in the example under consideration where "654" is multiplied by "9", the stop bars would be positioned by the tens plate to arrest the hundreds rack bars in the fifth position, the tens rack bar in the fourth position, and the units rack bar in the third position. Thus at the end of the first operation of the handle there would be registered in the rear totalizer "543", which represents the tens partial product of "654" multiplied by "9". When any of the tens multiplying plates are tilted rearwardly their carried pawls 259 are caused to drop behind a restoring plate 260, and a shoulder on said pawl to drop behind a pin 261 on the complementary units multiplying plate. It might be well, perhaps, to describe how the multiplier key is released at the end of the rearward movement of the first stroke of the handle. This is accomplished by the mechanism shown in Fig. 12 wherein it will be seen that the rock shaft which carries plate 253 is provided with an arm 200 which carries a tappet 201. The shaft 212 heretofore described carries a cam projection 202 which, on the forward movement of the handle lifts the tappet 201 but does not disturb the position of the plate 253. When, however, the handle moves rearwardly and just before it completes its rearward movement this cam projection strikes the tappet 201 and lifts the plate 253 from behind the shoulder 252, releasing the operated multiplier key and permitting it to return to normal position, appropriate springs being connected to said multiplier keys to assist in their return movement. A light spring 203 holds the tappet 201 in position, and a spring 204 holds the plate 253 in its normal position.

To return now to a description of the multiplier plates, when the shoulder of pawl 259 on the tens plate rests behind the pin 261 on the complementary units selecting plate, the movement of the bar 251 by the operation of the releasing mechanism just above described will cause the upper end of the tens multiplying plate to be returned to normal position, which movement, however, will displace its complementary units multiplying plate, tilting said units plate forwardly so as to place its projections in the paths of the cross arms 247. The second operation of the handle will now cause the cross arms to be arrested by such of these projections on the units multiplying plate as may be in their paths, and in the example under consideration the units partial product of "654" multiplied by "9" is "456." The stepped stop bars therefore are positioned by the units multiplying plate in the operation under consideration so as to arrest the rack bars in positions indicative of "456", which is the number registered in the rear totalizer. Before introducing the units partial product into the rear totalizer, however, the rear or product totalizer must be stepped one position to the left after the tens partial product is introduced therein, and this is done at the beginning of the second stroke of the handle in the multiplying operation; thus before the units partial product is introduced into the rear totalizer the tens partial product of "543", by virtue of the movement of the totalizer one step to the left, stands with respect to the rack bars as "5430". When the units partial product of "456" is introduced into the rear totalizer, the wheels of the rear totalizer in adding the units partial product to the tens partial product will represent "5886", which is the complete product of "654" multiplied by "9". To restore the forwardly tilted units selecting plate 262, the restoring plate 260 is yieldingly mounted on the vertically movable cross head 215, and as said cross head vibrates to restore the stepped stop bars 239 whose lower ends rest on top of said bar, the restoring plate 260 lifts the pawl 259, raising it from the pin 261, and permits the units selecting plate to assume an upright position under the action of its connected spring 263.

A guide plate 264 is arranged between the frame plates 237 for guiding and stopping the tens and units partial product selecting plates to and from their tilted and home positions. This guide plate, as shown in Fig. 10, serves as a stop for the tens plates in their upright position, but permits their tilted motion rearwardly. Of course, with respect to the units plates the guide slots are staggered with respect to those employed for the tens plates, so that the units plates are permitted to tilt forward, they being stopped in an upright position by the engagement of the plate at their rear edges.

The means for preventing movement of all the rack bars 100 except those which are in use in any given multiplying operation, consists of the stepped stop bars themselves which are collectively depressed so as to present the zero stop shoulders in the paths of the projections 242.

By referring to Figs. 13 to 22 and 24 to 31, it will be observed that each of the selecting plates is provided with a relatively high projection marked "0" arranged at or near their rear edges. In the tens multiplying plates these projections are so positioned that when the parts are tilted rearwardly the said projections will be located under the rearmost cross arm 247, and in the units multiplying plates these projections are located at the extreme rear edge of the selecting plate so that when the plates are tilted forwardly the said zero projections will be located under the rearmost cross arm 247. Consequently whenever a pendant is in engagement with the rearmost cross arm 247 that pendant and its associate stop bar can only be depressed a short distance, in which position the zero shoulder of the extension 243 lies directly in front of the projection 242 of the rack bar.

In order to cause the rear totalizer to move laterally one step at the commencement of the second stroke of the handle in multiplying operations, which has been heretofore referred to, I arrange a vertically movable cam bar 295 and suitable guides in the frame containing the multiplying mechanism, which cam bar is provided with a tappet 293 at its end to coöperate with the pawls 289 and 298 which operate upon the rack 288 the same as in the before-mentioned patent. The bar 295 in the present instance, however, is operated by novel means as follows: 296 is a hook lever carried by the bar, whose upper end is pressed inwardly by a light spring against the restoring plate 260. The lower end is provided with a hook portion designed, upon the second pull of the handle, to engage under the vertically movable cross head 215 and to vibrate the bar 295, effecting the step motion of the rear totalizer before referred to. The hook lever 296 is caused to engage the cross head 215 by virtue of the spring 250 which moves the bar 251 rearwardly. When the pawl 259 on the tens plate drops behind the pin 261 on the units plate, the detaining plate 253 holds the bar 251 in its forward position. In this position the pawl 259 is behind the restoring plate 260. As the handle approaches the limit of its rearward movement upon the completion of its first stroke, the plate 253 is raised, releasing the bar 251, thereby giving freedom of action to the relatively strong spring 250 which overcomes the light spring 263 (used for restoring the units plate), forcing said units plate to be tilted forwardly coincidently with the return movement of the tens plate to its upright position. It is this return movement of the tens plate that the lowered pawl 259 which engages the restoring plate 260, and through the medium of said restoring plate forces the upper end of pawl 296 outwardly, and the hook portion of said pawl under the cross head 215, where it remains while the handle is making its second stroke in multiplying operations.

The rear totalizer comprising the wheels 268 is caused to engage the racks in the manner and by substantially the same means disclosed in the patent aforesaid, and therefore it is deemed unnecessary to give a detailed description of the same here.

*Means for throwing all the multiplying devices out of operation during the ordinary operations of addition.*—By referring to Fig. 1 it will be observed that there is a pinion 265 which is driven by a segmental gear 266, which segmental gear is operated at each stroke of the handle, and the pinion is likewise driven at each stroke of the handle. I prefer, however, to disconnect the pinion from the multiplying mechanism during the ordinary operations of addition, as at such time it is unnecessary to move any of the multiplying parts. To do this I interpose a clutch between the pinion 265 and the shaft 212 which it drives as shown in Figs. 2 and 11. The movable member of this clutch is formed on the hub of the pinion 265 whose face is wide enough to engage the teeth of its driving segment 266 in any of the positions to which said pinion may be moved. The hub portion of the pinion is provided with a circumferential groove in which is arranged one arm of a bell crank lever 267, the other arm of which lever is operated by the pin 321, which is the pintle between the toggle levers 276 and 276ª. Link 276 is in the form of a plate which extends across the rear ends of the bars 251, which bars are provided with projections 251ª which are designed to engage the upper end of plate 276 and straighten the toggle links. When the toggle links are straightened the bell crank extension of the upper link 276ª is depressed so as to lie in close proximity to a lever 297 having a pin or projection 297ª in the path of movement of the lower end of bar 295; hence when said bar 295 is vibrated on the second stroke of the handle in multiplying operations, the end of the bell crank extension of this toggle lever construction will be engaged and the toggle lever broken. The breaking of the toggle lever through the instrumentality of the projecting pin 321 causes the pinion 265 to be disengaged from the shaft 212, and thus in all ordinary additive operations of the machine the pinion is idly vibrated, none of the parts of the multiplying mechanism being operated. When, however, any multiplier key is depressed the toggle is straightened and the clutch thrown into operative position, where it remains during two operations of the handle. As the handle completes the forward movement on the second stroke, the lever 297 is operated but the clutch remains in engagement during the return movement of the handle in completing its second stroke, the clutch members being disengaged just prior to the completion of the second stroke of the handle. The driven clutch member carries a semicircular disk 299 which constitutes a track plate whose forward edge normally lies above the bell crank lever 267. When, however, the bell crank lever is thrown to engage the clutch members this track plate 299 is rocked so that notwithstanding the breaking of the toggle joint at the end of the forward movement of the handle on the second stroke, the track plate 299 prevents the clutch members from becoming disengaged until the handle approaches the extremity of its rearward movement on the completion of its second stroke, at which time the track disk moves above the bell crank lever 267, leaving it free to be operated under the impelling action of its spring to disengage the clutch members.

*Means for preventing the operation of the multiplier keys when one of said keys is depressed.*—When any one of the multiplier keys in group B is depressed, one of the bars 251 connected to the operated key is drawn forward, and this action results in straightening the toggle links 276—276ª just described.

266ª indicates a latch plate mounted loosely on the shaft upon which the segmental gear 266 is mounted, the rear end of said latch plate being normally supported by the upper edge of the toggle link 276. In the normal position of the latch plate the projections 251ª on the draw bars may freely pass under the rear edge thereof. When, however, one of said projections is moved forward upon the operation of the multiplier key and passes under said latch plate, in the operation of straightening the toggle, the toggle link 276 being removed no longer supports the latch plate, which drops under the impelling action of its spring 266ᵇ in front of all the remaining projections 251ª, thus preventing any other multiplier key from being operated during the time that one of said keys stands depressed. The breaking of the toggle restores the latch plate to normal position.

The toggle link 276 is connected to a plate 277 mounted on a shaft 278, which shaft carries a rock arm 279 coöperating with the bell crank lever 180—181 to shift the cams 82—109 so as to cause the proper engagement between the rear totalizer and the rack bars in registration, and addition of partial products, the shifting of the cams preventing the engagement between the forward totalizers and the rack bars during the multiplying operation.

To print the product registered in the rear totalizer it is only necessary to press the "P" key and pull the handle once in the same manner and by the same means described in the aforesaid patent. When the "P" key is depressed to print the product, the rear totalizer wheels are cleared, the rear totalizer is moved back to its initial or starting position at the right, and the multiplicand is cleared from the multiplying devices.

Means whereby the rear totalizer is cleared are the same in this case as in the patent herein mentioned so it is unnecessary to describe the same in detail here. The means by which the rear totalizer is returned to normal position consists of a bar 365 which in the before-mentioned patent was operated by a key in the key board designated as the decimating key. By means of this key the rear totalizer can be stepped back toward the right to eliminate unnecessary decimals in the product, non-type-carrying-decimal rack bars being provided to clear the decimated part of the product of the rear totalizer. In my present case I propose to operate the bar 365 by means of a decimating key 361 in the key board of the machine (see Fig. 1), and in addition to operate said bar 365 from the operating handle when the "P" key is depressed. Means for doing this consists of a rock arm 301 carrying a pin 302 which normally lies in an inoperative position. The rock shaft 303 upon which the arm 301 is mounted, is capable of longitudinal movement against a spring 304, see Fig. 2. Shaft 303 carries a rock arm 305 having a spring-pressed tappet 306 at its upper end, which tappet coöperates with a button head 307, see Fig. 6, on one of the side frames or main operating levers 105. These levers 105 and their carried restoring bar 104 operate at each stroke of the handle regardless of what work the machine is doing. When the product key is depressed (see Fig. 34), the bell crank lever 311—312 is rocked so as to shift the hub 313 and its carried arms 314 and 317. The upper end of bell crank lever 312 carries a pin 315 whose path of movement is in axial alinement with the longitudinally movable shaft 303, so that when said shaft is moved the pin 302 has a path of movement including the bar 365. Thus, after depressing the "P" key and operating the handle, the arm 305 is moved laterally so that the tappet 306 on its upper end is located behind the upper end of the button-shaped projection 307, where it remains during the forward and rearward movement of the handle, and until the handle is approaching the extremity of its rearward movement. The forward movement of the handle idly vibrates the tappet, and the button head will be located in front thereof. The rearward movement of the handle, however, positively rocks the tappet and the arm 305 rearwardly, the button-shaped head holding the tappet 306 in engagement therewith until the handle approaches the rear extremity of its movement, when said tappet is released, and during this engagement and rearward movement of the arm 305 the decimating bar 365 is operated. There is this difference, however, in the operation of the decimating bar by means of the mechanism just described as compared with the manual operation of said bar by means of the decimating key; when the decimating key is operated, the bar 365 is raised, and in displacing the pawls 289 and 298 said bar temporarily serves as a stop to arrest the rack 288, and in this manner the step-by-step movement necessary in decimating a product a certain number of times can be accomplished. Where the bar 365 is not raised but moved rearwardly by the restoring mechanism just described, it is obvious that said bar cannot serve as a temporary stop as it did in the step-by-step movement, but when it moves away from the rack 288 and carries with it the two pawls the rack and its connected totalizer may be returned to their initial position at the right under the impelling action of the spring 366.

The means for restoring the pendants in clearing the multiplying mechanism of a number upon the taking of a product, consists of a sweep arm 350, see Figs. 10 and 11, operating in a suitable guide-way in one of the frame plates 237 just above the horizontal portions 236 of the stop arms 239. This sweep arm is connected by a link 351, see Figs. 3 and 4, to a lever 352, which lever lies just within the left-hand main lever 105. Lever 352 is connected by a sliding pin connection with the rock arm 314. This sliding pin connection is such that the arms 314 and 317 may be moved laterally without disturbing the position of the lever 352, and without breaking the connection between said lever and arm 314. When the "P" key is depressed the arms 314 and 317 are moved laterally as before described, in which lateral position the arm 317 lies in the path of movement of a pin 318 arranged on a downward extension of the cam plate 82. Depressing the "P" key does not laterally displace the cam plates 82—109, and consequently when the handle is pulled the pin 318, through the arms 317—314, rocks the lever 352 and causes the sweep arm to vibrate, moving all the pendants, which may have been positioned, rearwardly to their normal or home position. The forward end of the guide-way in the plate 237 in which this sweep arm is mounted is formed with a vertical pocket to accommodate the slight vertical movement of the sweep arm when the "E" key is depressed, and all of the stop bars with their horizontal portions 236 are raised to engage the rack bars. A spring-pressed arm 354 bears upon the sweep arm to insure its return to normal position after having been raised into vertical pocket.

*Means for retaining the multiplicand in the multiplying devices.*—This consists in the provision of means for preventing the sweep arm 350 from acting when the "P" key is depressed. In order that the "P" key can restore the pendants it is necessary that said pendants be lifted so as to disengage the connection between the cross arms 247 and the slots in the lower ends of said pendants. This lifting is accomplished upon the depression of the "P" key in the same manner as it is upon the depression of the "E" key, that is, by means of the rock arm 221, which has a pin $222^a$ extending over the rear end of the bell crank lever $222^b$, which is operated by the "P" key. In this manner the shaft 220 and its connections are operated when the "P" key is depressed, but unlike the "E" key, the "P" key does not raise the pendants far enough so that the toothed projection $c$ on the rack bars will interfere with their return movement. In other words, the extent of the lift of the pendants by the "P" key is approximately one-half the amount of lift given when the "E" key is operated. In retaining the pendants in their adjusted positions, it is obvious that it is undesirable to elevate them to effect the disengagement therebetween and the cross arms, and to avoid this disengagement means are provided for laterally displacing the shaft 220 and its arm 221 so that when the "P" key is depressed and the bell crank extension $222^b$ is raised it will not coöperate with the pin $222^a$. To effect this displacement the "D" or decimal key is operated. Referring to Figs. 32 and 33, it will be seen that this "D" key operates a bell crank extension 348 whose rear end engages a lever 349 having a bent rear end formed with an inclined face which coöperates with the pin $220^a$ on shaft 220. Whenever the "D" key is depressed the shaft 220 and its carried parts are thus laterally displaced. To retain a number in the multiplying devices, the "P" key may be first operated and then the "D" key depressed, or the "D" key may be operated and the "P" key depressed. In the first instance, the operation of the "P" key will raise the pendants slightly in readiness to be cleared, as in the ordinary operation of taking a product, but when the "D" key is operated the pendants are restored to their former position. The depression of the "D" key in addition to displacing the shaft 220 also shifts the cams 82—109 so that it is possible to introduce an item directly into the rear totalizer wheels to the exclusion of the forward totalizer, as described in the aforesaid patent. To insure the half-way position of the "D" key in this operation I provide an auxiliary key $d$ which is normally held elevated by a spring, and which is provided with a conical face operating upon a spring-pressed lateral pin $d'$ which coöperates with shoulders in the shank of the "D" key. When the keys "D" and $d$ are simultaneously depressed the blocking pin $d'$ is moved into the path of the shoulder on the shank of the "D" key, and consequently the "D" key will be arrested in its half-way position. This blocking pin provides a positive stop to limit the downward travel of the "D" key and insures the proper position of the parts. In the operation of introducing an item into the rear totalizer where the "D" key is employed, the "D" key may be depressed its full extent if the $d$ key is not operated; thus the auxiliary key does not interfere in any way with the normal working of its master key. Another function performed by the machine when the "D" key is in its half-way position is that of printing a number set up on the key board of the adding machine without registering said number in any of the totalizers. After an example has been set up on the keys in group A, if the keys "D" and $d$ are simultaneously depressed, the half-way position of the "D" key will locate cams 82—109 in a midway or inoperative position with respect to the totalizers, and neither the rear or forward totalizers will be thrown into mesh with the rack bars. In introducing an example into the machine by depressing the "D" key, before striking the last digit of the number introduced into the machine it will bring into operation the same means employed in the patent hereinbefore mentioned.

The advantage of retaining a number in the multiplying devices for repeated operations of multiplication, that is, obtaining separate products of the same number, will be understood from the following:

```
20 yds. cloth @ $10.00 per yd_____ $200.00
60  "     "   @   5.00  "   "  _____  300.00
                                       ───────
                                       $500.00
   5% discount for cash_____       25.00
                                       ───────
                                       $475.00
```

In the above example the words of course could be written by the typewriting mechanism of the machine, and the items extended by the adding and multiplying mechanism. Assuming that the "500" appeared in one of the forward totalizers, that number could, by depressing the "E" key and pulling the handle, be placed in the multiplying mechanism. To obtain the discount of 5%, the "5" multiplier key in group B would be depressed and the handle pulled twice, after which, the multiplier being a decimal in the hundredths column, the decimating key 361 would be operated twice to step the rear totalizer two steps to the right. The product ($25.00) in the rear totalizer would now be printed under the footing by pressing the "P" key and pulling the handle; but to retain the multiplicand in the multiplying mechanism the "D" key together with its auxiliary blocking key would be depressed half-way as heretofore described. The rear or product totalizer would of course stand clear at the end of this operation, and the multiplicand would still be represented by the pendants. To obtain the balance due it is only necessary to multiply the multiplicand by the difference between the rate of discount (.05) and 100%. This difference being 95, the "9" key in group B is pressed and the handle pulled twice, and the "5" key in group B depressed and the handle pulled twice, after which the decimating key is operated twice, and then the product key can be depressed and the handle pulled once, when the machine will stand clear as to its multiplying mechanism and the rear totalizer, the product printed being 475.

*Subtraction.*—The principle of operation which is followed and which constitutes the rule of subtraction adopted and carried out in this machine in obtaining a remainder, being the result of one number, the subtrahend, subtracted from another number, the minuend, is briefly as follows: The complement of the subtrahend, plus one, is added to the minuend. In following this rule in the present machine, the minuend or larger number to be subtracted from, is introduced into the rear totalizer, which for sake of distinction in this operation may be designated as the minuend register. The subtrahend may be introduced into any one of the forward totalizers, which for sake of distinction in describing this operation may be designated as a subtrahend register. There are setting up devices for the subtrahend, said setting up devices comprising the pendants which are positioned to represent the subtrahend. These pendants or subtrahend setting up devices are controlled by the actuating racks, which in turn may be controlled either by the subtrahend register (by pressing the "E" key and pulling the handle) or by the stop pins 93 (by setting up the example on the keys in group A, depressing the "E" key, and pulling the handle.) Thus it will be seen that the subtrahend may be directly set up on the pendants from the key board, or may be transferred to the pendants from the subtrahend register.

In addition to the above, means are provided for automatically adding one to the sum of complement of the subtrahend added to the minuend in obtaining the correct remainder. This one is necessary to eliminate the mines occasioned by the reverse rotation of the register wheels to their zero stops. If the zero stops could be eliminated and the wheels turned back to zero in the operations of mechanical subtraction it would be unnecessary to add the one.

In the operation of the present machine, in subtraction, the minuend is first set up in the rear totalizer wheels in any of the several ways by which this may be done, that is, a number may be transferred from any one of the forward totalizers; the number may be directly set up in the rear totalizer through the keys in group A by holding the "D" key down and pulling the handle; or the number in the minuend register may be a product previously obtained in the multiplying operations, which product is retained in said register by holding the "P" key down at the time the product is recorded. Operating the "P" key and pulling the handle restores the pendants, and holding the "P" key down re-introduces the number into the rear totalizer. We will assume for the purposes of our present explanation that the number representing the minuend is in the rear totalizer or minuend register, and that the subtrahend is represented by the position of the pendants in the setting up mechanism as a result of operating the "E" key, as before described. A key marked "S" (subtraction), in this instance arranged at the extreme left-hand side of the key board, is operated by being pushed rearwardly (or said key may be mounted so as to be depressed as are the other result keys "P", "T" or "D"). The handle is then pulled, which operation automatically adds one to the number in the minuend register, obtains a complement of the subtrahend, and adds said complement in the minuend register. To obtain the answer or remainder the "P" key is depressed and the handle operated, which operation, like the taking of a product, makes a record of the number, clears the rear totalizer, and introduces the remainder into one of the forward totalizers. In repeated operations of subtraction the various remainders may be accumulated in any one selected group of forward totalizer wheels.

The subtraction key is indicated by the numeral 400, see Fig. 2, and carries a bar 401 at its rear end, said bar being formed with an inclined face which operates under the bell crank lever 180—181 to shift the cams 82 and 109 to the third position, in which the forward totalizer is not thrown into engagement with the rack bars, but the rear totalizer is thrown into engagement with the rack bars upon the rearward movement of the handle to register in said rear totalizer the complement of the subtrahend and add it to the minuend. In this operation the minuend register wheels rotate forwardly so that the carrying mechanism operates to carry from lower to higher orders. The bar 401 which is operated by the subtraction key coöperates with a lever 402, which lever is pivotally mounted on the base plate of the machine and coöperates with a slotted link 403, which link is connected to the bell crank clutch lever 267 heretofore described. Thus when the subtraction key is operated the clutch is thrown into engagement so that the pull of the handle will operate the multiplying devices. The purpose of providing the slot in the link 403 is to enable the subtraction key to be returned to its normal position before the bell crank 267 is permitted to disengage the clutch at the extremity of the rearward movement of the handle when released by the segmental track plate heretofore described. The lever 402 is connected by means of a rod 404 to a sliding bar 451 having a shoulder to coöperate with a plate 253 in the same manner as the bars 251, which are operated by the multiplier keys, are provided with shoulders to coöperate with said plate, and for the same purpose, to wit, to hold the key in its operated position until the handle has made its forward movement and is approaching the limit of its rearward movement in the completion of its stroke. Bar 404 is also connected to a lever 405, which lever is like the levers 254 which coöperate with the tens multiplying plates, except that its projection 406 is arranged under the shaft 255 instead of above said shaft. In this manner, when the rod 404 moves forwardly the lever 405 will tilt the subtraction plate 406 forwardly. This subtraction plate, which is shown in Fig. 23, resembles the selecting plates of the multiplying mechanism in general characteristics. There is, however, a very important distinction, and that is that the arresting shoulders for the subtraction plate progress diametrically opposite to what they do in the tens partial product multiplying plate identified with the "9" key. Thus, the "9" shoulder of the subtraction plate when tilted forward lies directly under the zero shoulder of the "9" plate; the "8" shoulder of the former is directly under the "1" shoulder of the latter, etc., the fifth shoulder of the former being on the same horizontal plane as the "4" shoulder of the latter, and the "0" shoulder of the former or subtraction plate being directly above the "9" shoulder of the "9" plate. The complement of any digit is another digit which, added to the first, will make "9"; thus considering zero as a digit, "9" added thereto will make 9; or considering "1" as a digit, 8 added thereto will make 9, etc. Ordinarily in the arrangement of the arresting shoulders of multiplying plates of the character employed in the multiplying mechanism of this machine, the "0" multiplying plate for obtaining the tens partial product, and the units multiplying plate are opposite to each other, but in this case, because the zero shoulder is at the rear edge of the plate it is in the form of a post and next to the ninth position shoulder on the units plate, as shown in Fig. 10. The units multiplying plate resembles the complementary subtraction plate in so far as the arresting shoulders uniformly progress, but as before stated, the zero arresting shoulder is at the wrong end of the series of shoulders.

In Fig. 38, I have illustrated diagrammatically the relation of the complementary subtraction plate to several of the parts with which it coöperates. In this figure it will be observed that when the subtraction plate 407 is tilted forwardly so as to have its arresting shoulders in the paths of the cross arms 247, when said cross arms are lowered they will be arrested progressively in substantially stepped formation, the rearmost or zero cross arm being the lowest and the 9 or foremost cross arm being the highest of the series. Considering now that the steps numbered on the subtraction plate from 9 to zero correspond to the steps on the stepped bar 243, and that the cross arms 247 numbered from zero to 9 represent the degree of forward movement of a rack bar, it will be obvious that any pendant in engagement with the zero or rearmost cross arm will in the lowered position of said cross arm position the stepped bar 243 so that the rack bar controlled thereby can move forward the full limit of its movement or to the ninth position. Here it will be noticed that 9 is the complement of zero, and any pendant in engagement with the zero cross arm will, when the subtraction key is operated and the handle pulled, register 9 in the minuend register. Any pendant in engagement with the 1 cross arm will, in the operation of subtraction, position its stepped bar 243 to arrest its controlled rack in the eighth forward position. Here we also find that 8 is the complement of 1. The cross arm marked "2" will position the rack controlled by its coöperating pendant in the seventh position, and so on throughout the entire series.

To illustrate the operation of subtraction, we will assume that the machine stands clear and it is desired to subtract "350" from "475." 475 is struck on the keys in group A, the "D" key depressed and the handle operated. This number 475 is thus introduced into the rear totalizer or minuend register. The subtrahend "350" is set up on the keys in group A, the "E" key depressed and the handle operated. In this operation the pendant identified with the units column is left in its rearmost or zero position; the pendant identified with the tens column is advanced to the 5 position; and the pendant identified with the hundreds column is advanced to the third position. The subtraction key is now pressed rearwardly, which positions the parts as heretofore described, and the handle operated. Upon the operation of the handle all of the cross arms are lowered until arrested by the shoulders on the subtraction plate, and the several rack bars controlled by the positions of the several pendants will be moved forward respectively as follows: The rack bar identified with the units column will be moved forward to the 9 position because its controlling pendant is in engagement with the zero cross arm and 9 is the complement of zero. The rack bar in the tens column will be moved forward to the 4 position because its controlling pendant has been advanced to coöperate with the 5 cross arm, and 4 is the complement of 5. The hundreds rack bar will be moved forward to the 6 position because its controlling pendant is in engagement with the 3 cross arm, and 6 is the complement of 3. All the other rack bars of higher order will be advanced to the 9 position because all of their controlling pendants are in engagement with the zero cross arm. When all of the rack bars are forward the minuend register is caused to engage said rack bars, and upon the return movement of said rack bars the complementary numbers are registered therein and added to the minuend previously registered in said register. As the minuend under consideration is 475 and as the complement of the subtrahend is 649, with a series of nines in the higher orders, it will be observed that 649 added to 475 will make 1124. The one being carried from the hundreds column to the thousands column will be added to the 9 in the thousands and other higher columns, and consequently the higher order register wheels when the one is carried to them will stand at zero or cleared, and the number actually represented will be 124. This of course is not the correct answer because 350 subtracted from 475 leaves 125. In the operation of mechanical subtraction for reasons above given it is necessary to add one to the remainder, and this is accomplished as follows: Referring to Fig. 3, it will be observed that the stop bar 239 of highest order, the one at the left-hand side of the machine, is provided with a pin 409 with which coöperates a tappet 410 mounted on a sliding bar 411 arranged for the sake of convenience parallel to the racks 100. An appropriate spring keeps pawl 410 in engagement with the pin 409, and whenever a stop bar of highest order is depressed, which is at every operation in subtraction, the bar 411 is moved rearwardly. Bar 411 carries a cam projection 412 on its upper edge, see Fig. 39, with which coöperates one end of a bell crank lever 413, the other end of the bell crank lever being arranged under the restraining bar 124 of the carrying mechanism, which bar is identified with the units column. The vibration of bar 411 thus trips the units restraining bar 124 in a manner similar to that when restraining bars of higher order are tripped in the operation of carrying. This tripping of the restraining bar is therefore equal to adding one number in the minuend register, as the spring-pressed driving segment 129 will, instantly that the restraining pawl 124 is released, move the units register wheels one tooth. The stop bars 239 are lowered upon the initial forward movement of the operating handle, and consequently one is added in the minuend register upon the initial movement of the handle, and before the complement of the subtrahend is introduced into said register, which latter introduction occurs during the rearward movement of the handle. Hence, at the end of the handle operation the one has been added to the minuend and the complement of the subtrahend has been added to the sum of the minuend and one, and the minuend register stands with the correct remainder therein which can be taken at any time by pressing the "P" key and operating the handle. All remainders thus obtained may be accumulated in any one of the forward totalizers selected for that purpose, and the total of said remainders taken at any time.

*Means for locking the result keys against operation when a multiplier key is depressed.*—In multiplying, two strokes of the handle are necessary for each digit except the zero and one, and in order to insure these two strokes being given the handle means are provided which will lock the result key "P", "E", "T" and "D" against operation before the handle finishes its second stroke in the operation of multiplying.

Referring to Figs. 6 and 41, it will be seen that the shaft 278 to which the plate 277 connected with the toggle link 276 is connected carries an arm 279 which coöperates with a bell crank lever 180—181 to shift the cams 82—109 to a neutral position in the operation of multiplying. This neutral position is taken by the cams whenever a multiplier key is depressed, and I utilize the movement of the arm 279 in engagement with an extension of a plate 280 to force the forward hooked end of said plate into alining notches in the parallel links constituting part of the result key connections. Spring 281 normally holds this plate out of engagement with the said notches. As the bar 295 breaks the toggle and consequently depresses the arm 279 when the handle is in a forward position, it is necessary to provide some means for holding the plate 280 in its locking position, if it is desired not to release said result keys until the handle approaches the rearward limit of its movement. To do this I provide a hooked pawl 282 which is held rearwardly by a spring 283 and its hooked end under a pin 284 on an extension of plate 280. The hooked lever 282 is permitted to assume this position by a pin 285 extending from the hub of cam 109. When the handle is forward this pin 285 is out of engagement with the hooked lever 282, and consequently this hooked lever holds the plate 280 in engagement with the result key connections. However, upon the completion of the rearward movement of the handle pin 285 disengages the hooked lever and releases the locking plate 280. As the bar 295 is not vibrated until the handle makes its second stroke in the multiplying operations, it will be seen that upon the depression of any multiplier key in group B the result keys are locked against operation, they remaining so locked until just before the handle completes its second stroke.

Having thus described the invention, what is claimed as new and desired to be secured by Letters Patent is:

1. In a calculating machine, the combination of a laterally shiftable paper carriage, a series of laterally movable groups of totalizer wheels, means tending at all times to move said groups of totalizer wheels in one direction, an escapement mechanism for controlling the movement of said laterally shiftable groups of totalizer wheels, means on the paper carriage for operating said escapement mechanism and also for returning said laterally shiftable groups of totalizer wheels to their normal and starting position, and devices operable independently of the paper carriage for positioning said groups of totalizers.

2. In a calculating machine, a laterally shiftable paper carriage, laterally shiftable totalizers under control of said carriage, an escapement mechanism operated by the movement of the carriage in one direction to shift the position of said totalizers, means on the carriage for returning said totalizers by a movement in the opposite direction, a rod for operating the escapement mechanism independently of any movement of the carriage, and means for restoring the totalizers independently of any movement of the carriage.

3. In a calculating machine, the combination of a laterally movable paper carriage, laterally shiftable groups of totalizer wheels whose position is normally under control of said carriage, an escapement mechanism operable by said carriage for controlling the movement of said totalizers in one direction, and means operable independently of any movement of the carriage for operating said escapement mechanism.

4. In a calculating machine, the combination of a laterally movable paper carriage, laterally shiftable groups of totalizer wheels, means on the paper carriage for moving the groups of totalizer wheels in one direction, and means operable independently of any movement of the carriage for moving said totalizer wheels in the same direction as when normally moved by said carriage.

5. In a calculating machine, the combination of shiftable groups of totalizers, actuating devices therefor, and a rotary indicator for indicating the particular totalizer in operative relation to said actuating devices; substantially as described.

6. In a calculating machine, the combination with a plurality of totalizers, a manually operable rod for controlling the movement of said totalizers in one direction, manually operable means for effecting the movement of said totalizers in the opposite direction, and an indicator controlled by the position of said totalizers for indicating the particular totalizer in operative position; substantially as described.

7. In a calculating machine, the combination of a product register, partial products selecting plates, and means for shifting said plates to bring them into operative position; substantially as described.

8. In a calculating machine, the combination of a product register, tens and units partial product plates, and means for alternately shifting said plates to bring them into operative position; substantially as described.

9. In a calculating machine, the combination of a product register, a tens partial product plate, key controlled means for moving said plate to an operative position, and means controlled by the tens partial products plate for moving the units partial products plate into operative position.

10. In a calculating machine, the combination of a product register, tens and units partial product plates, and means for successively tilting said plates into operative position; substantially as described.

11. In a calculating machine, the combination of actuating devices, setting up devices for controlling said actuating devices which are normally disengaged from said actuating devices, whereby said actuating devices may be operated independently of said setting up devices, means for causing the engagement between said setting up devices and said actuating devices whereby the former are positioned by the latter, cross arms with which the setting up devices coöperate when so positioned, and tens and units partial product plates for coöperating with said cross arms; substantially as described.

12. In a calculating machine, the combination with actuating devices, setting up devices for controlling said actuating devices, cross arms with which said setting up devices coöperates, tens and units partial product plates provided with shoulders for arresting said cross arms, means for moving said plates in position where said shoulders can coöperate with said cross arms; substantially as described.

13. In a calculating machine, the combination with actuating devices, setting up devices for controlling said actuating devices, cross arms with which the setting up devices coöperate, said cross arms having a definite path of movement, tens and units partial product plates having arresting shoulders which are normally out of the paths of movement of said cross arms, and means for moving one of said plates so that said shoulders are placed in operative position; substantially as described.

14. In a calculating machine, the combination with a product totalizer, actuating devices therefor, setting up devices for controlling said actuating devices and which are positioned by said actuating devices, and means whereby said setting up devices are kept in their adjusted positions during product-taking operations; substantially as described.

15. In a calculating machine, the combination with a plurality of shiftable adding totalizers, a product totalizer, actuating devices for said totalizers, setting up devices positioned by said actuating devices for controlling said actuating devices, tens and units partial product plates for coöperating with said setting up devices in multiplying operations, and means whereby in the product-taking operation the setting up devices are permitted to remain in their adjusted position, whereby at the end of said product-taking operation the product totalizer stands clear but the setting up devices are in position to coöperate with other parts of the multiplying mechanism in further multiplying operations; substantially as described.

16. In a calculating machine, the combination of a main operating shaft, multiplying devices, which are normally inoperative during operation of the main operating shaft, means for setting up a multiplicand therein composed of one or more figures, and multiplier keys for placing said multiplying devices under control of said operating shaft and rendering said multiplying devices effective.

17. In a calculating machine, the combination with a totalizer in which numbers may be registered and added, digit keys by which numbers to be added in said totalizer are introduced, multiplying plates for controlling the movement of said totalizer independently of the connections controlled by the digit keys, multiplier keys for controlling said multiplying plates whereby said totalizer registers tens and units partial products, means for operating said plates and means for rendering said plate and operating means inoperative during the operations of introducing numbers through the digit keys into said totalizer.

18. In a calculating machine, the combination with adding devices, a power shaft for driving the same, multiplying devices, and a clutch interposed between the power shaft and said multiplying devices, which clutch renders said multiplying devices inoperative during the ordinary operations of addition; substantially as described.

19. In a calculating machine, the combination of a power shaft, multiplying devices, multiplier keys, and means operated by a multiplier key for operatively connecting the power shaft to said multiplying devices; substantially as described.

20. In a calculating machine, the combination with a power shaft, multiplying devices which are normally at rest during the ordinary operations of addition, multiplier keys, and means operated by each of said multiplier keys to connect the power shaft to the multiplying devices upon the operation of said multiplier keys; substantially as described.

21. In a calculating machine, the combination of a power shaft, multiplying devices, a clutch interposed between said power shaft and said multiplying devices, means for operating said clutch to engage the power shaft with the multiplying devices, and means for maintaining such engagement during the time the power shaft makes two complete strokes; substantially as described.

22. In a calculating machine, the combination of a power shaft, multiplying devices, a clutch interposed between the power shaft and multiplying devices, and means on the driven member of the clutch for holding the clutch in engagement during two complete strokes of the power shaft only; substantially as described.

23. In a calculating machine, the combination of a power shaft, multiplying devices, a clutch interposed between said multiplying devices and said power shaft, a lever for rendering said clutch operative, and means connected with the driven member of the clutch for preventing the return movement of said lever in disconnecting said clutch while the power shaft is in other than normal position; substantially as described.

24. In a calculating machine, the combination of multiplier keys, bars 251 which are drawn forward upon the operation of said multiplier keys, posts on said bars, which posts coöperate with part of the multiplying mechanism, and a hinged plate which is operated upon the movement of any one of said multiplier keys to lock all the other multiplier keys against operation; substantially as described.

25. In a calculating machine, the combination of multiplier keys, bars connected thereto, which bars are drawn forward upon the operation of any one of said multiplier keys, shoulders on said bars, a toggle link with which said shoulders coöperate, a hinged plate controlled by said toggle link to lock all of the bars, except the operated bar, in their home position, and a clutch mechanism which is also controlled by said toggle link; substantially as described.

26. In a calculating machine, the combination of a product totalizer, means for stepping the same to the left in multiplying operations, means for stepping the same to the right in the operation of decimating the product, and manual and mechanical devices for operating said last-mentioned means; substantially as described.

27. In a calculating machine, the combination of a product totalizer, means for stepping the same to the left in the operation of multiplication, a decimating key for stepping said product totalizer to the right to eliminate unnecessary digits in the product, and mechanical means for operating said last-mentioned mechanism independently of said manually operable decimating key; substantially as described.

28. In a calculating machine, the combination of a product totalizer, means for stepping the same to the left in the operations of multiplication, and means for automatically restoring said product totalizer to its initial or home position upon the taking of a product therefrom; substantially as described.

29. In a calculating machine, the combination of a product totalizer, means for stepping the same to the left in the operations of multiplication, and means operated by the power shaft of the machine for returning said product totalizer to its initial or home position; substantially as described.

30. In a calculating machine, the combination of a product totalizer, means for stepping the same to the left in the operations of multiplication, and means operated by the power shaft of the machine for restoring said product totalizer to its home position, and a manually operable decimating key for operating said restoring means to step the product totalizer to the right; substantially as described.

31. In a calculating machine, the combination of a product totalizer, a pawl and ratchet mechanism for stepping the same to the left in the operations of multiplying, means coöperating with said pawl and ratchet mechanism whereby the product totalizer is stepped to the right in decimating the product, and means coöperating with said pawl and ratchet mechanism whereby said product totalizer is permitted to return to its home position; substantially as described.

32. In a calculating machine, the combination of a product totalizer, yielding means for holding the same in home position at the right, pawl and ratchet mechanism coöperating with the product totalizer to step the same to the left, in the operations of multiplication, a power shaft, and means operated by the power shaft for disengaging said pawl and ratchet mechanism, whereby the product totalizer is restored to its home position under the influence of said yielding means; substantially as described.

33. In a calculating machine, the combination of a product totalizer, a spring for holding the same in its normal or home position at the right, a ratchet and pawl mechanism for stepping the same to the left in the operations of multiplication, and means coöperating with said pawl to release the same and permit the product totalizer to return home when the product-taking operation has been completed; substantially as described.

34. In a calculating machine, the combination with a product totalizer, a spring which normally holds the same in its home position, ratchet and pawl mechanism for stepping said product totalizer to the left, a manually operable decimating key and its connections whereby through said ratchet and pawl mechanism said totalizer may be stepped to the right in eliminating unnecessary digits from the product, a power shaft, and means operated by the power shaft for releasing said pawl and permitting the product totalizer to assume its home position at the completion of a product-taking operation; substantially as described.

35. In a calculating machine, means for representing a number corresponding to the minuend, devices for representing a number corresponding to a subtrahend, means for moving the first mentioned means under control of the subtrahend representing devices to thereby add the complement of the subtrahend to the minuend, and means for adding "1" in a number contained in the minuend representing means.

36. In a calculating machine, the combination of means for representing a number corresponding to a subtrahend, means for moving the first mentioned means under control of the subtrahend representing devices to thereby add the complement of the subtrahend to the minuend and simultaneously adding "1" in the units column of the minuend representing means.

37. In a calculating machine, the combination of means for representing a number corresponding to a minuend, devices for representing a number corresponding to a subtrahend, means for articulating said minuend representing means and subtrahend representing devices whereby the complement of the subtrahend is added to the minuend, and means for adding "1" in the units column of the minuend representing means simultaneously with said articulation.

38. In a calculating machine, the combination of a minuend register, actuating devices therefor, devices which are positioned to represent the subtrahend, means for obtaining the complement of said subtrahend, which complement-obtaining means controls the movement of the actuating devices whereby in the operation of obtaining the complement of the subtrahend said complement is added to the minuend register; substantially as described.

39. In a calculating machine, the combination of a minuend register, actuating devices therefor, devices which are positioned to represent the subtrahend, means for obtaining the complement of said subtrahend, which complement-obtaining means controls the movement of the actuating devices, and means operated by the actuating devices for adding one in the minuend register; substantially as described.

40. In a calculating machine, the combination with subtrahend setting up devices, a totalizer, and means for transferring a number in the totalizer to the subtrahend setting up devices; substantially as described.

41. In a calculating machine, the combination with subtrahend setting up devices, a key board, and means controlled by the key board for setting up a number in said subtrahend setting up devices; substantially as described.

42. In a calculating machine, the combination with subtrahend setting up devices, a totalizer, actuating devices for said totalizer, means whereby the number registered in said totalizer may be set up as a subtrahend through said actuating devices, and a key board whereby said actuating devices may be controlled in setting up the subtrahend independently of said totalizer; substantially as described.

43. In a calculating machine, the combination with a minuend register, means for setting up a number therein, subtrahend setting up devices, means for setting up a subtrahend therein, a subtraction key, and means operable when said subtraction key is operated to obtain the complement of the subtrahend added to the minuend and also automatically add one to the sum of said minuend and the complement of said subtrahend in the minuend register, whereby the correct remainder is registered in the minuend register; substantially as described.

44. In a calculating machine, the combination with a multiplying plate and a subtraction plate, devices coöperating with each of said plates in the operation of multiplication and subtraction respectively; substantially as described.

45. In a calculating machine, movable tens and units partial product plates and a movable subtraction plate, devices coöperating respectively with said plates in the operations of multiplication and subtraction, and means for appropriately moving said plates to perform multiplying or subtracting operations; substantially as described.

46. In a calculating machine, the combination with movable tens and units partial product plates and a subtraction plate having stop shoulders with recesses between said stop shoulders, and cross arms, which travel in the recesses of the tens and units partial product plates or the subtraction plate in the operation of subtraction or multiplication as the case may be.

47. In a calculating machine, the combination with tens and units partial product plates and a subtraction plate, devices coöperating therewith, and means for setting up in said devices a number which represents a multiplicand and a subtrahend when the machine performs the operation of multiplication and subtraction respectively; substantially as described.

48. In a calculating machine, the combination with a minuend register means for obtaining and registering in said minuend register the complement of the subtrahed, and means coöperating with the units wheel of the minuend register to add one to the sum of the minuend and the complement of the subtrahend registered in said minuend register; substantially as described.

49. In a calculating machine, the combination with a minuend register, carrying devices therefor, means for obtaining and adding to the minuend in said register the complement of the subtrahend, and means coöperating with the carrying mechanism identified with the units wheel of said register to add one to the sum of the minuend and the complement of the subtrahend in said register, which last mentioned means is operated during the operation of obtaining the complement of the subtrahend; substantially as described.

50. In a calculating machine, the combination with a main operating shaft, means for operating said shaft, subtraction and multiplying devices, a clutch interposed between said devices and said shaft, and keys for controlling said subtraction and multiplying devices, said keys also operating said clutch to place the operating shaft in control of said devices.

51. In a calculating machine, the combination of means for representing a number corresponding to a minuend, devices for representing a number corresponding to a subtrahend, and means for articulating the above mentioned means and devices and moving the minuend representing means under control of the subtrahend representing devices to thereby add the co-digits or the complement of the subtrahend to the minuend.

52. In a calculating machine, the combination of means for representing a number corresponding to a minuend, devices for representing a number corresponding to a subtrahend, a power shaft common to both of said above mentioned means and devices, and means for placing the first mentioned means under control of the subtrahend representing devices whereby upon a single operation of said power shaft the complement or co-digits of the subtrahend will be mechanically determined and added to the minuend representing devices.

53. In a calculating machine, the combination of means for representing a number corresponding to a minuend, devices for representing a number corresponding to a subtrahend, a power shaft in common operative control of both of said above mentioned means and devices, means for placing the minuend representing means under control of the subtrahend representing devices whereby upon a single operation of said power shaft the complement of co-digits of the subtrahend will be added in the minuend representing devices and "1" also simultaneously and automatically introduced into the units column of said minuend representing devices.

54. In a calculating machine, the combination of means for representing a number corresponding to a minuend, devices for representing a number corresponding to a subtrahend, and means for articulating the above mentioned means and devices and moving the minuend representing means under control of the subtrahend representing devices to thereby add the co-digits or the complement of the subtrahend to the minuend, an independent set of register wheels and means for transferring the remainders from said minuend representing means and accumulating them in said register wheels.

55. In a calculating machine, the combination of a series of wheels, devices which are positioned to represent a number composed of one or more digits corresponding to a subtrahend, and means coöperating with said subtrahend representing devices whereby said wheels are caused to be moved in an additive direction to register the difference between the digit, or digits, in the number in said subtrahend representing devices and "9".

56. In a calculating machine, the combination of a power shaft, means for representing a number composed of one or more digits corresponding to a subtrahend, actuators, means for placing said actuators under control of said subtrahend representing devices whereby upon a single operation of said power shaft, said actuators are moved a distance equal to the difference between each digit of the subtrahend and "9".

57. In a calculating machine, the combination of a power shaft, means for representing a number composed of one or more digits corresponding to a subtrahend, actuators, means for placing said actuators under control of said subtrahend representing devices whereby upon a single operation of said power shaft, said actuators are moved a distance equal to the difference between each digit of the subtrahend and "9", and a series of register wheels into which such co-digits or complemental numbers are registered.

In testimony whereof I hereunto affix my signature in the presence of two witnesses, this sixth day of May 1908.

HUBERT HOPKINS.

Witnesses:
GEORGE BAKEWELL,
LENORE WILSON.